(12) United States Patent
Tomita et al.

(10) Patent No.: US 9,225,217 B2
(45) Date of Patent: Dec. 29, 2015

(54) ELECTRIC POWER COLLECTION AND DISTRIBUTION RING, ELECTRIC MOTOR AND METHOD OF MANUFACTURING ELECTRIC MOTOR

(71) Applicants: HITACHI CABLE, LTD., Tokyo (JP); Hitachi Cable Fine-Tech, Ltd., Ibaraki (JP)

(72) Inventors: Kazuhiko Tomita, Mito (JP); Kenichi Egami, Kitaibaraki (JP); Takahiro Futatsumori, Hitachi (JP); Kazuyuki Watanabe, Hitachi (JP)

(73) Assignee: HITACHI METALS LTD., Tokyo (JP)

( * ) Notice: Subject to any disclaimer, the term of this patent is extended or adjusted under 35 U.S.C. 154(b) by 262 days.

(21) Appl. No.: 13/910,024

(22) Filed: Jun. 4, 2013

(65) Prior Publication Data

US 2013/0328425 A1 Dec. 12, 2013

(30) Foreign Application Priority Data

Jun. 7, 2012 (JP) .................................. 2012-129836
Dec. 3, 2012 (JP) .................................. 2012-264580

(51) Int. Cl.
*H02K 3/50* (2006.01)
*H02K 11/00* (2006.01)
*H02K 15/00* (2006.01)
*H02K 3/52* (2006.01)

(52) U.S. Cl.
CPC .. *H02K 3/50* (2013.01); *H02K 3/52* (2013.01); *H02K 3/522* (2013.01); *H02K 11/0094* (2013.01); *H02K 15/00* (2013.01); *H02K 15/0075* (2013.01); *H02K 2203/09* (2013.01); *Y10T 29/49009* (2015.01)

(58) Field of Classification Search
CPC . H02K 2203/09; H02K 2203/06; H02K 3/52; H02K 3/50
See application file for complete search history.

(56) References Cited

U.S. PATENT DOCUMENTS 6,011,339 A * 1/2000 Kawakami .................... 310/208
7,034,419 B2 * 4/2006 Kabasawa et al. ............. 310/71
7,045,920 B2 * 5/2006 Ohuchi et al. .................. 310/71
2001/0070293    4/2004 Kabasawa et al.
2006/0138884 A1 6/2006 Kabasawa et al.
2010/0109456 A1* 5/2010 Sugiyama et al. .............. 310/71

FOREIGN PATENT DOCUMENTS

JP           3701639 B2    7/2005

* cited by examiner

*Primary Examiner* — Dang Le
(74) *Attorney, Agent, or Firm* — Roberts Mlotkowski Safran & Cole P.C.

(57) ABSTRACT

An electric power collection and distribution ring includes a plurality of annular bus rings for collecting and distributing power to windings of a stator, the windings being covered with an insulation cover and the stator being formed by winding the windings around a plurality of teeth arranged in a circular pattern. The bus ring is formed by annularly coupling a plurality of arc-shaped conductive members each including terminal portions at both circumferential end portions, the terminal portions being welded to each other together with an end portion of the winding. The terminal portion includes a first contact surface coming into contact with the end portion of the winding at the time of the welding and a second contact surface to be a contact point between the terminal portions.

15 Claims, 19 Drawing Sheets

10 ELECTRIC POWER COLLECTION AND DISTRIBUTION RING

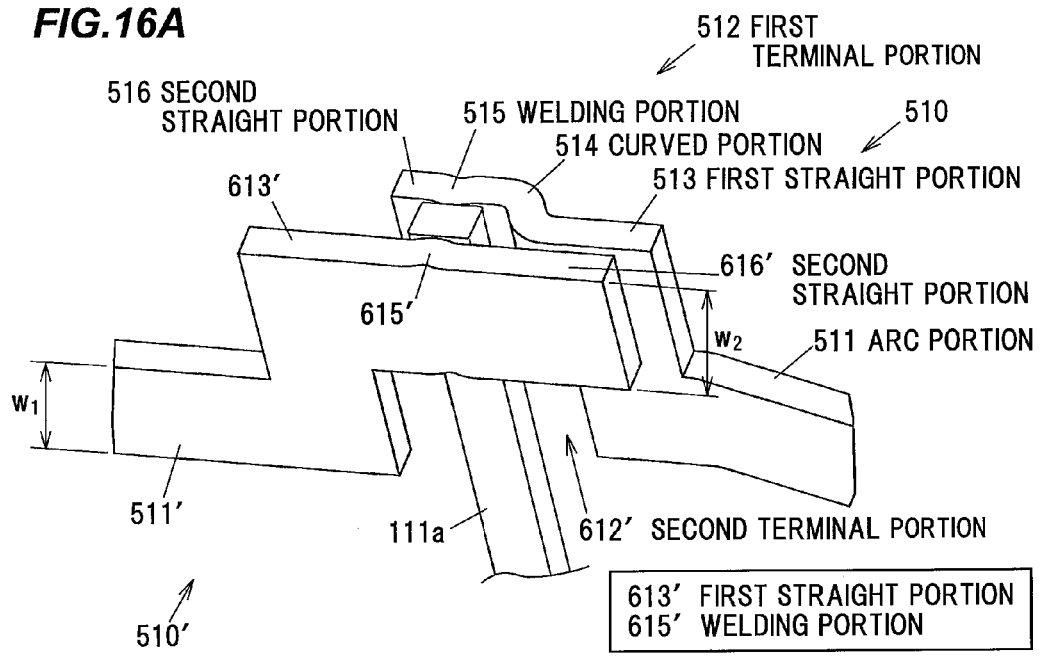
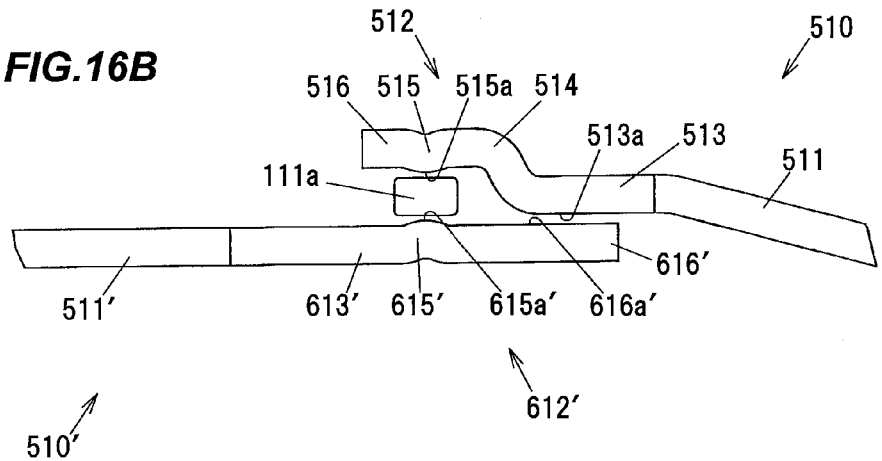

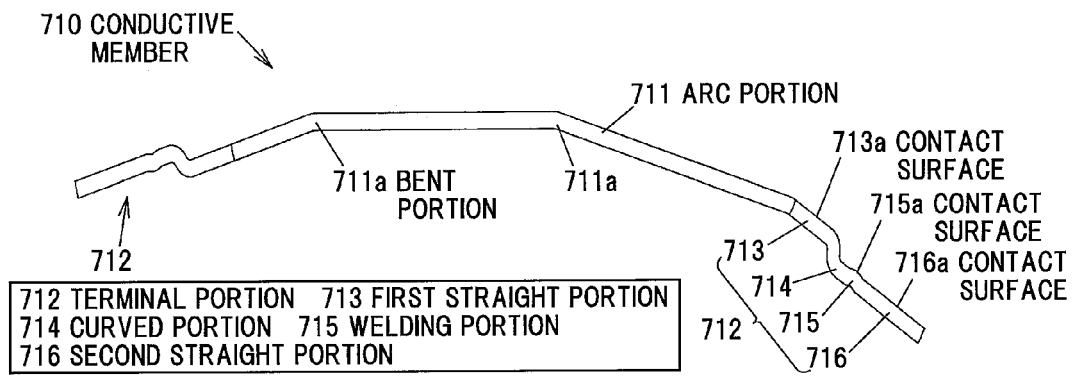
FIG.18A
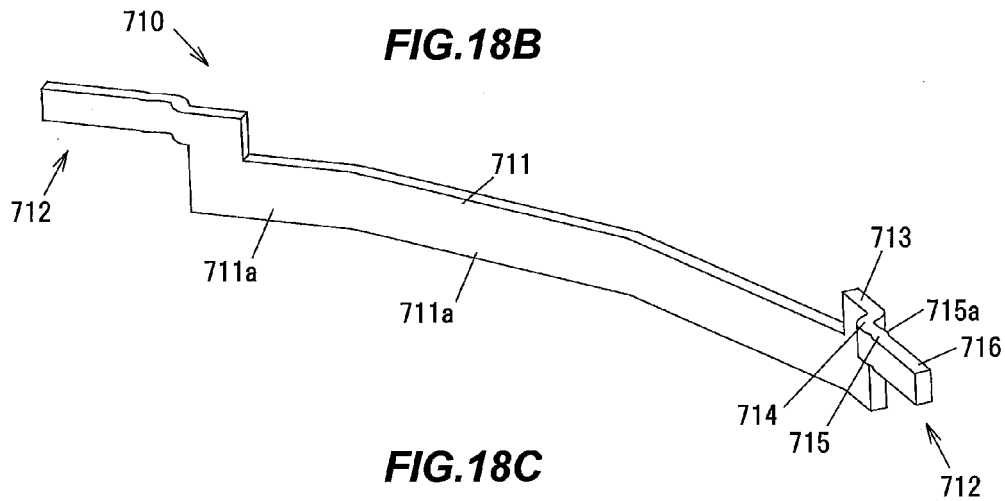
FIG.18B
FIG.18C
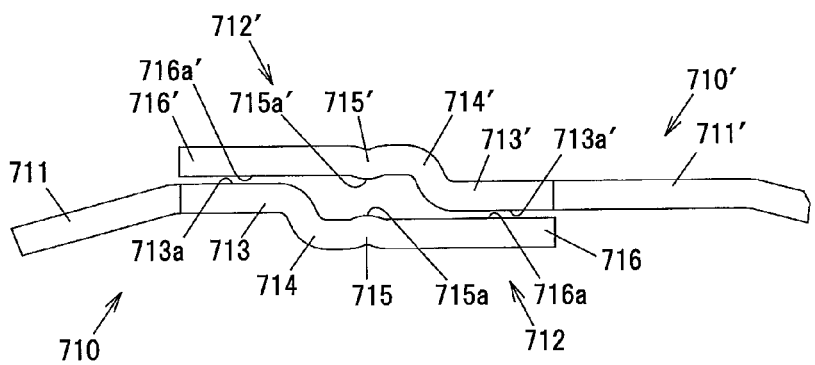
FIG.18D
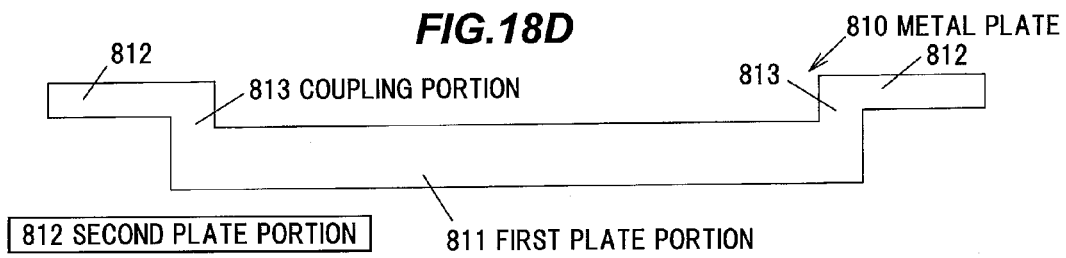

ELECTRIC POWER COLLECTION AND DISTRIBUTION RING, ELECTRIC MOTOR AND METHOD OF MANUFACTURING ELECTRIC MOTOR

The present application is based on Japanese patent application Nos. 2012-129836 and 2012-264580 filed on Jun. 7, 2012 and Dec. 3, 2012, respectively, the entire contents of which are incorporated herein by reference.

BACKGROUND OF THE INVENTION

1. Field of the Invention

The invention relates to an electric power collection and distribution ring, an electric motor using the electric power collection and distribution ring and a method of manufacturing the electric motor.

2. Description of the Related Art

Conventionally, an electric power collection and distribution ring for collecting and distributing motor current (power collection and distribution) to a winding of a stator in, e.g., a three-phase AC motor is known (see, e.g., Japanese patent No. 3701639).

A power distribution component (electric power collection and distribution ring) described in Japanese patent No. 3701639 is formed in an annular shape by coupling plural arc-shaped frame parts in a ring pattern. Terminal portions are formed at an end portion of each frame part by a bending process after removing an insulation cover of a tip end portion. Among the plural frame parts, a pair of adjacent frame part is coupled such that a terminal portion of one frame part and a terminal portion of another frame part are soldered or welded together with the winding of the stator.

SUMMARY OF THE INVENTION

Since the winding of the stator has the insulation cover which is formed by, e.g., applying enamel to a surface of a conductor such as copper, it is necessary to preliminarily remove the insulation cover of the winding in the power distribution member described in Japanese patent No. 3701639 when the end portion of the winding is soldered or welded to the terminal portion of the frame part. In other words, a process of removing the insulation cover of the winding is required for electrically connecting the power distribution component to the winding of the stator and man-hours for this process hinders cost reduction and labor time reduction.

Accordingly, it is an object of the invention to provide an electric power collection and distribution ring that allows the electrical connection for achieving the power collection and distribution with the windings without removing the insulation cover of a winding of a stator, as well as an electric motor using the electric power collection and distribution ring and a method of manufacturing the electric motor.

(1) According to one embodiment of the invention, an electric power collection and distribution ring comprises:

a plurality of annular bus rings for collecting and distributing power to windings of a stator, the windings being covered with an insulation cover and the stator being formed by winding the windings around a plurality of teeth arranged in a circular pattern, wherein the bus ring is formed by annularly coupling a plurality of arc-shaped conductive members each comprising terminal portions at both circumferential end portions, the terminal portions being welded to each other together with an end portion of the winding, and wherein the terminal portion comprises a first contact surface coming into contact with the end portion of the winding at the time of the welding and a second contact surface to be a contact point between the terminal portions.

In the above embodiment (1) of the invention, the following modifications and changes can be made.

(i) The conductive member integrally comprises an arc portion extending along a circumferential direction of the bus ring and the terminal portions, and wherein the terminal portions protrude with respect to the arc portion in a radial direction of the bus ring.

(ii) The conductive member integrally comprises an arc portion extending along a circumferential direction of the bus ring and the terminal portions, and wherein the terminal portions extend from the arc portion along the circumferential direction of the bus ring.

(iii) The second contact surfaces are provided at two positions sandwiching the first contact surface.

(iv) A width of the conductive member in an axial direction of the bus ring is smaller at the terminal portion than at the arc portion.

(v) The first contact surface is provided closer to a tip end of the terminal portion than the second contact surface.

(vi) The terminal portion comprises a curved portion on the arc portion side of the first and second contact surfaces, the curved portion being curved so as to protrude toward a circumferential middle portion of the arc portion.

(vii) The wiring is a rectangular wire having a rectangular cross section, and wherein the first contact surface is formed in a convex arc shape that protrudes toward the winding.

(2) According to another embodiment of the invention, an electric motor comprises:

the electric power collection and distribution ring according to the above embodiment (1);

the stator; and a rotor that is rotated with respect to the stator by a magnetic field of the winding.

(3) According to another embodiment of the invention, a method of manufacturing an electric motor, wherein the electric motor comprises a stator formed by winding windings covered with an insulation cover around a plurality of teeth arranged in a circular pattern, a rotor that is rotated with respect to the stator by a magnetic field of the windings, and a plurality of annular bus rings for collecting and distributing power to the windings, the method comprises:

annularly arranging a plurality of arc-shaped conductive members constituting the bus rings so that terminal portions formed on respective both end portions face each other;

inserting an end portion of the winding between the terminal portions without removing the insulation cover;

pressing the terminal portions in a direction of approaching each other to bring the terminal portions into contact with each other and also to sandwich the end portion of the winding between the terminal portions; and welding the terminal portions to each other together with the end portion of the winding by supplying electricity to the conductive member.

EFFECTS OF THE INVENTION

According to one embodiment of the invention, an electric power collection and distribution ring can be provided that allows the electrical connection for achieving the power collection and distribution with the windings without removing the insulation cover of a winding of a stator, as well as an electric motor using the electric power collection and distribution ring and a method of manufacturing the electric motor.

BRIEF DESCRIPTION OF THE DRAWINGS

Next, the present invention will be explained in more detail in conjunction with appended drawings, wherein:

FIGS. 4A and 4B show a first bus ring, wherein FIG. 4A is a front view and FIG. 4B is a perspective view;

FIGS. 7A and 7B show a neutral conductor, wherein FIG. 7A is a plan view and FIG. 7B is a perspective view;

FIGS. 8A and 8B show a first bus ring of a second embodiment, wherein FIG. 8A is a front view and FIG. 8B is a perspective view;

FIGS. 9A to 9D show a conductive member in the second embodiment, wherein FIG. 9A is a front view, FIG. 9B is a perspective view, FIG. 9C is a partial enlarged view and FIG. 9D is a plan view showing a metal plate before being shaped into the conductive member;

FIGS. 10A and 10B show a conductive member in a third embodiment, wherein FIG. 10A is a front view and FIG. 10B is a partial enlarged view;

FIGS. 16A and 16B are enlarged views showing a conductive member in the eighth embodiment, wherein FIG. 16A is a perspective view and FIG. 16B is a front view;

FIGS. 18A to 18D show a conductive member in the ninth embodiment, wherein FIG. 18A is a front view, FIG. 18B is a perspective view, FIG. 18C is a partial enlarged view and FIG. 18D is a plan view showing a metal plate before being shaped into the conductive member; and FIGS. 19A and 19B are enlarged views showing the conductive member in the ninth embodiment, wherein FIG. 19A is a perspective view and FIG. 19B is a front view.

DETAILED DESCRIPTION OF THE PREFERRED EMBODIMENTS

First Embodiment

The first embodiment of the invention will be described in reference to FIGS. 1 to 7B.

Figure 1:
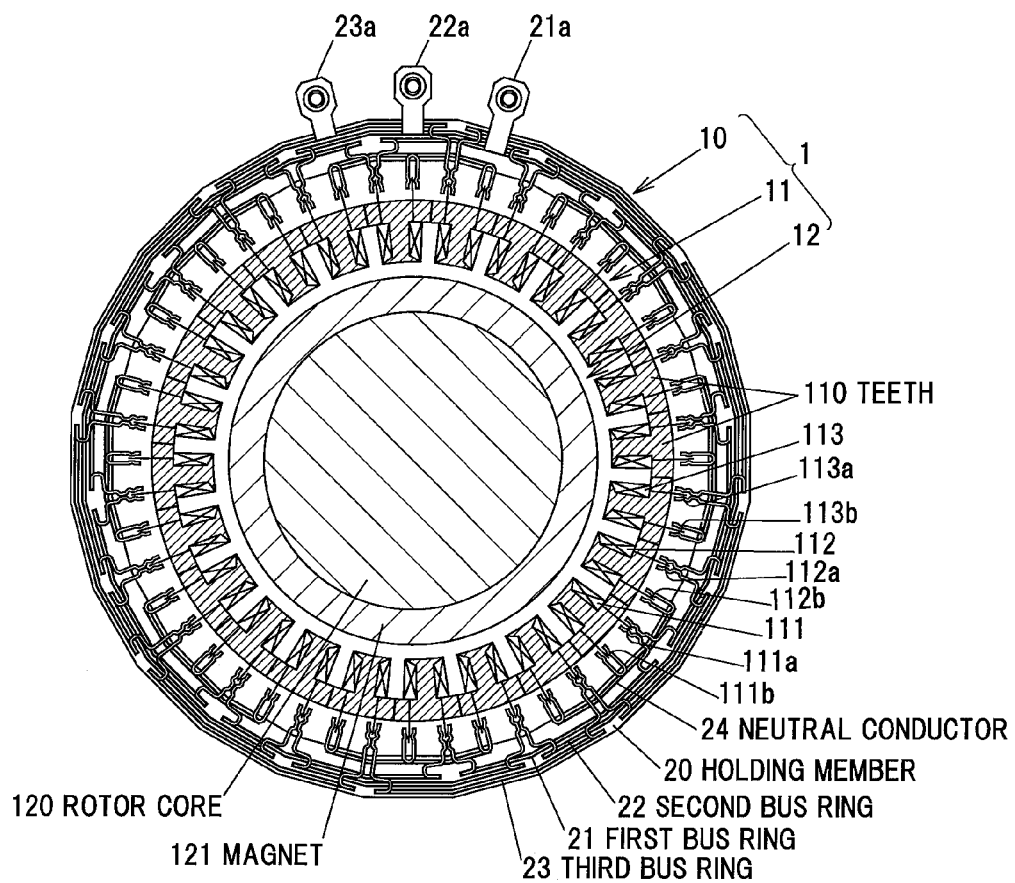
FIG. 1 is an explanatory diagram illustrating a structural example of an electric power collection and distribution ring and an electric motor in a first embodiment of the present invention.

FIG. 1 is an explanatory diagram illustrating a structural example of an electric power collection and distribution ring and an electric motor provided therewith in the first embodiment of the invention.

A electric motor 1 is provided with a stator 11, a rotor 12 and an electric power collection and distribution ring 10 for collecting and distributing motor current to the stator 11.

Multiple phase windings 111, 112 and 113 covered with an insulation of e.g., enamel are wound around circularly-arranged plural teeth 110 formed of a magnetic material, thereby forming the stator 11. The U-phase winding 111, the V-phase winding 112 or the W-phase winding 113 is wound around each tooth 110. In the first embodiment, the windings 111, 112 and 113 as a rectangular wire having a rectangular cross section will be described.

The electric power collection and distribution ring 10 is provided with first to third bus rings 21 to 23 and plural neutral conductors 24 for collecting and distributing power to the windings 111, 112 and 113, and a holding member 20 for holding thereof. Power supply terminals 21a, 22a and 23a are provided one each on the first to third bus rings 21 to 23 at a position in a circumferential direction thereof. The power supply terminals 21a, 22a and 23a protrude radially outward of the first to third bus rings 21 to 23 and are connected to output terminals of a non-illustrated inverter.

The first to third bus rings 21 to 23 distribute motor current output from the inverter to each of the U-, V- and W-phase windings 111, 112 and 113 of the electric motor 1. The first to third bus rings 21 to 23 and the plural neutral conductors 24 are held by the annular holding member 20 formed of a resin.

An end portion 111a on one side of the U-phase winding 111 is electrically connected to the first bus ring 21. An end portion 111b on another side of the U-phase winding 111 is electrically connected to the neutral conductor 24. Likewise, end portions 112a and 113a on one side of the V- and W-phase windings 112 and 113 are electrically connected to the second and third bus rings 22 and 23 and end portions 112b and 113b on another side of the windings 112 and 113 are electrically connected to the neutral conductors 24.

The rotor 12 has a rotor core 120 rotatably supported by a non-illustrated shaft bearing so as to be coaxial with the stator 11 and a magnet 121 having plural magnetic poles and fixed to an outer peripheral surface of the rotor core 120.

A motor current having sine waveforms 120 degrees out of phase with each other is supplied to the U-, V- and W-phase windings 111, 112 and 113 from the non-illustrated inverter and this creates a rotating magnetic field in the stator 11. The magnet 121 receives a torque generated by an attractive force and a repulsive force caused by the rotating magnetic field and the rotor core 120 is rotated with respect to the stator 11 by the torque.

Structure of Holding Member 20

Figure 2:
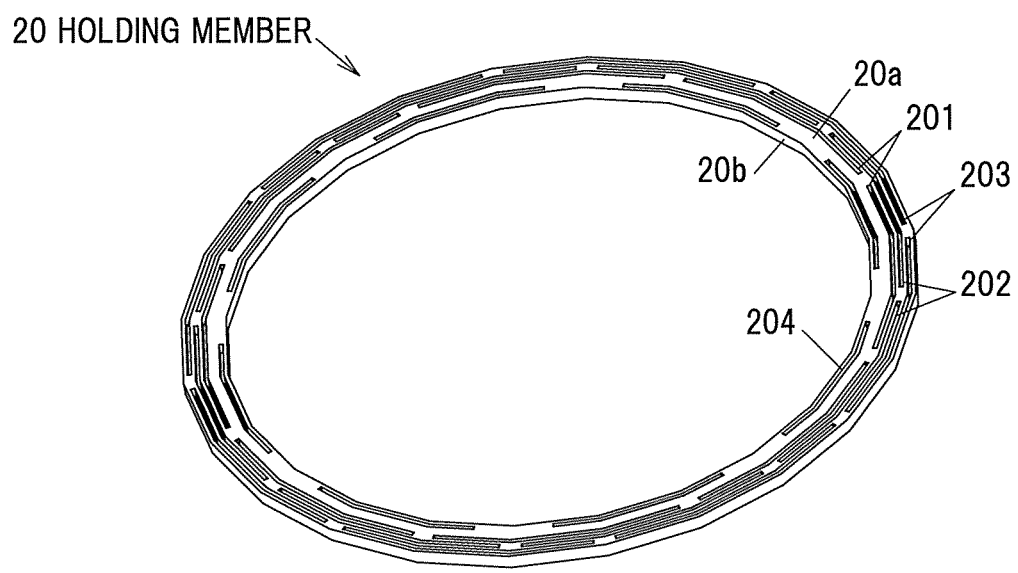
FIG. 2 is a perspective view showing a holding member.

FIG. 2 is a perspective view showing the holding member 20. The holding member 20 is formed of, e.g., an injection molded resin.

The holding member 20 has plural holding grooves 201 for holding the first bus ring 21, plural holding grooves 202 for holding the second bus ring 22, plural holding grooves 203 for holding the third bus ring 23 and plural holding grooves 204 for holding the plural neutral conductors 24. The holding grooves 201 to 204 are formed so as to be recessed in a thickness direction (an axial direction of the holding member 20) from a planar surface 20a of the holding member 20 (an end face on one side in the axial direction and parallel to a radial direction of the holding member 20).

In addition, the holding grooves 201 to 204 are formed in an arc shape as viewed from the planar surface 20a side. The holding groove 204 is provided inside the holding groove 201, the holding groove 201 is provided inside the holding groove 202 and the holding groove 202 is provided inside the holding groove 203.

Note that, the holding member 20 after placing the first to third bus rings 21 to 23 and the plural neutral conductors 24 in the holding grooves 201 to 204 may be resin-molded excluding a portion to be connected to the windings 111, 112 and 113.

Structure of Electric Power Collection and Distribution Ring 10

Figure 3A:
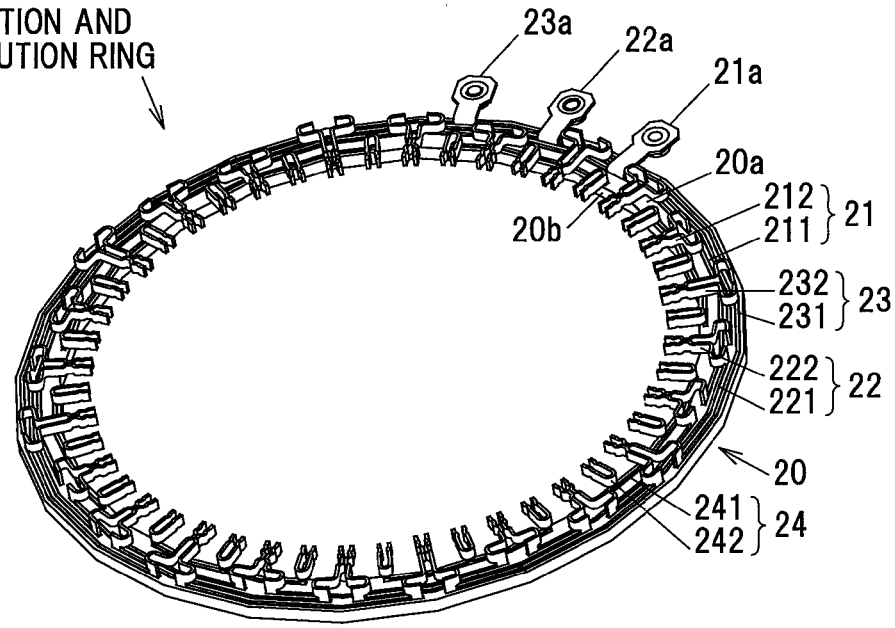
FIG. 3A is a perspective view showing the electric power collection and distribution ring and FIG. 3B is a partial enlarged view of FIG. 3A.
Figure 3B:
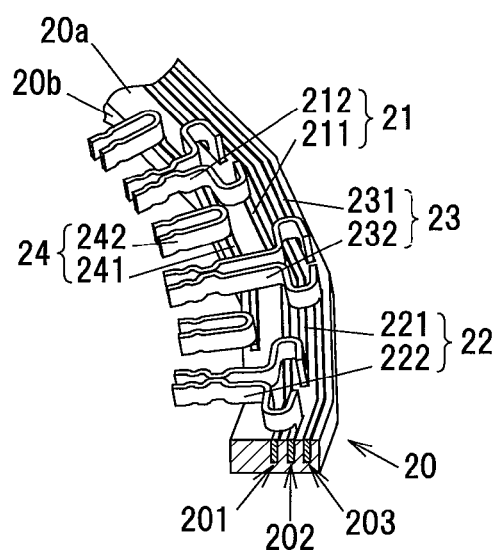

FIG. 3A is a perspective view showing the electric power collection and distribution ring 10. FIG. 3B is a partial enlarged view of FIG. 3A.

The first bus ring 21 has plural arc portions 211 housed in the holding grooves 201 of the holding member 20 and terminal portions 212 provided at both end portions of each arc portion 211. Likewise, the second and third bus rings 22 and 23 respectively have plural arc portions 221, 231 and terminal portions 222, 232 provided at both end portions of each arc portion 221, 231.

The neutral conductor 24 has an arc portion 241 housed in the holding groove 204 of the holding member 20 and three terminal portions 242 provided at both end portions and middle portion of the arc portion 241.

A position in a thickness direction of the holding member 20 is different between the arc portions 211, 221, 231 and 241 and the terminal portions 212, 222, 232 and 242, and the terminal portions 212, 222, 232 and 242 are located outside of the holding grooves 201 to 204 on one side of the planar surface 20a of the holding member 20.

The terminal portion 212 of the first bus ring 21 crosses over the arc portion 241 of the neutral conductor 24 and protrudes inward beyond an inner peripheral surface 20b of the holding member 20. The terminal portion 222 of the second bus ring 22 crosses over the arc portion 211 of the first bus ring 21 and protrudes inward beyond the inner peripheral surface 20b of the holding member 20. The terminal portion 232 of the third bus ring 23 crosses over the arc portion 241 of the neutral conductor 24, the arc portion 221 of the second bus ring 22 and the arc portion 211 of the first bus ring 21 and protrudes inward beyond the inner peripheral surface 20b of the holding member 20.

The terminal portions 242 of the neutral conductor 24 protrude inward beyond the inner peripheral surface 20b of the holding member 20 from respective positions defined between the terminal portion 212 of the first bus ring 21, the terminal portion 222 of the second bus ring 22 and the terminal portion 232 of the third bus ring 23.

Structure of First Bus Ring 21

Next, among the first to third bus rings 21 to 23, the first bus ring 21 will be taken as an example and the structure thereof will be described in detail. Note that, the second bus ring 22 and the third bus ring 23 are also configured in the same manner as the first bus ring 21.

Figure 4A:
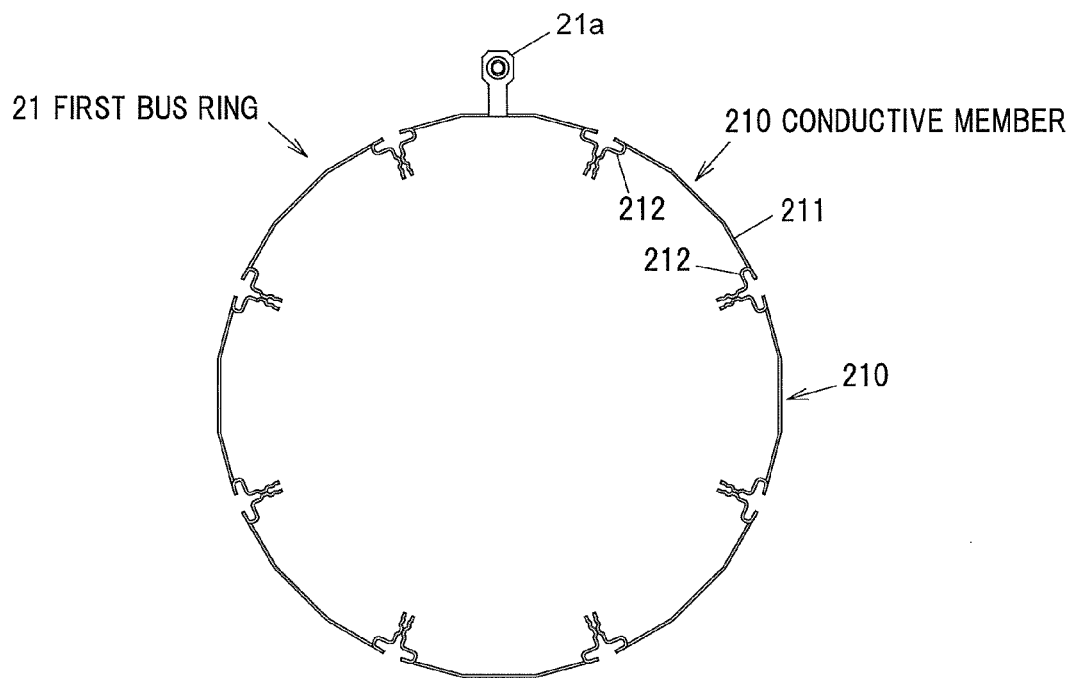
Figure 4B:
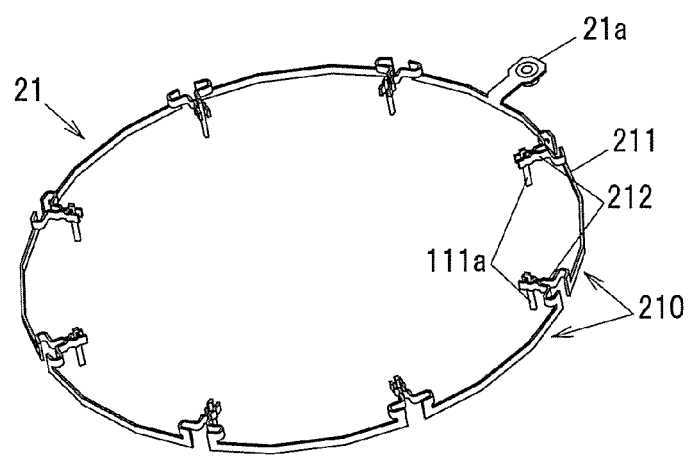

FIGS. 4A and 4B show the first bus ring 21, wherein FIG. 4A is a front view and FIG. 4B is a perspective view. In FIG. 4B, the end portion 111a of the U-phase winding 111 is shown together with the first bus ring 21.

The first bus ring 21 is formed by annularly coupling plural (eight) arc-shaped conductive members 210. The power supply terminal 21a is connected to one of the conductive members 210.

In the plural conductive members 210, the terminal portions 212 formed on both end portions thereof are welded to each other together with the end portion 111a of the U-phase winding 111. In other words, two adjacent conductive members 210 of the plural conductive members 210 are coupled by welding the terminal portion 212 of one conductive member 210 to the terminal portion 212 of another conductive member 210 together with the end portion 111a of the U-phase winding 111.

Structure of Conductive Member 210

Figure 5A:
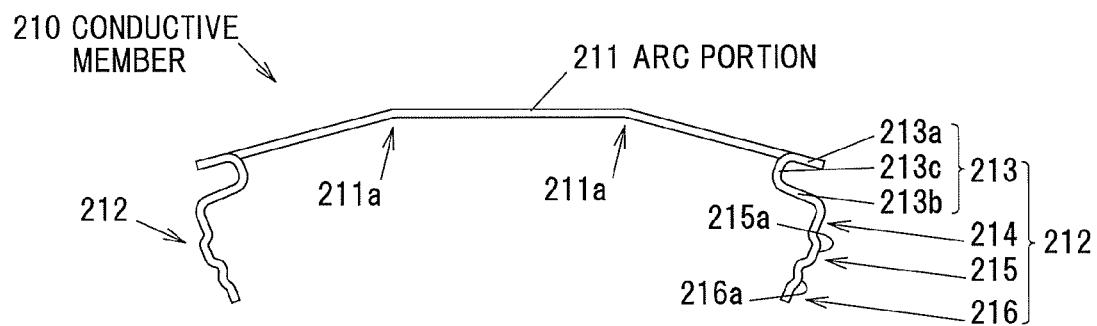
FIG. 5A is a front view showing a conductive member.
Figure 5B:
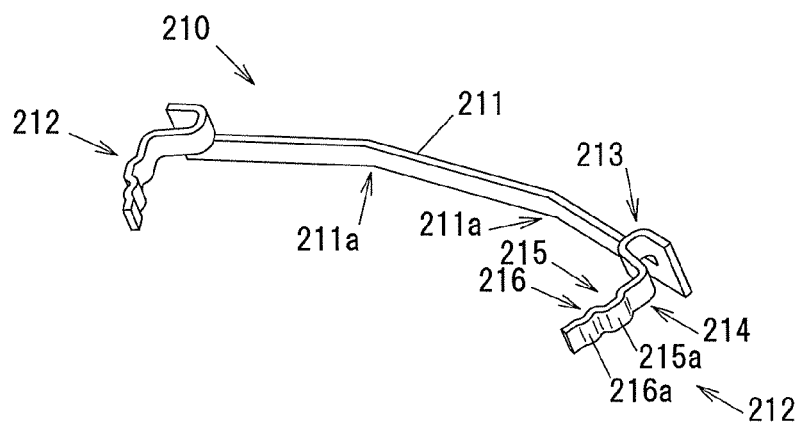
FIG. 5B is a perspective view and FIG. 5C is a plan view showing a metal plate before being shaped into the conductive member.

FIG. 5A is a front view showing the conductive member 210 and FIG. 5B is a perspective view.

The conductive member 210 is formed by bending a plate-like conductive body, integrally has the arc portion 211 and the terminal portions 212 and is formed in an arc shape as a whole. The arc portion 211 is bent at two bent portions 211a located at positions in a circumferential direction and has an arcuate shape extending along a circumferential direction of the first bus ring 21. The terminal portion 212 protrudes inward in a radial direction of the first bus ring 21 with respect to the arc portion 211.

The terminal portions 212 has a curved portion 213, an extension portion 214, a contact portion 215 and a welding portion 216. Of those members, the curved portion 213 is provided closest to the arc portion 211, and then, the extension portion 214, the contact portion 215 and the welding portion 216 are provided in this order on the inner side with respect to the curved portion 213 (inside of the first bus ring 21).

The curved portion 213 is provided contiguous to an end portion of the arc portion 211 and is curved so as to protrude toward the circumferentially middle portion of the arc portion 211, i.e., toward another end portion of the arc portion 211. In the first embodiment, the curved portion 213 has a U-shape in which a first region 213a and a second region 213b each extending along the arc portion 211 are smoothly coupled to a third region 213c which is formed between the first region 213a and the second region 213b so as to extend in a direction orthogonal to the arc portion 211.

The extension portion 214 is provided between the curved portion 213 (the second region 213b) and the contact portion 215. The extension portion 214 extends toward the arc center of the arc portion 211 and is linearly formed so that two extension portions 214 face each other in a parallel manner when the two conductive members 210 are arranged in a circumferential direction. Note that, the length of the extension portion 214 is different in each of the first to third bus rings 21 to 23.

The contact portion 215 is formed by bending into a trapezoid shape so as to protrude toward the terminal portion 212 of another circumferentially adjacent conductive member 210. A flat contact surface 215a to be a contact point between the terminal portions 212 is formed on a surface of the contact portion 215 on the side close to the terminal portion 212 of the other conductive member 210.

The welding portion 216 is provided at a tip end portion of the terminal portion 212 and faces the terminal portion 212 of the other circumferentially adjacent conductive member 210 via the end portion 111a of the winding 111. A contact surface 216a having a convex arc shape protruding toward the end portion 111a of the winding 111 is formed on the welding portion 216.

Figure 5C:
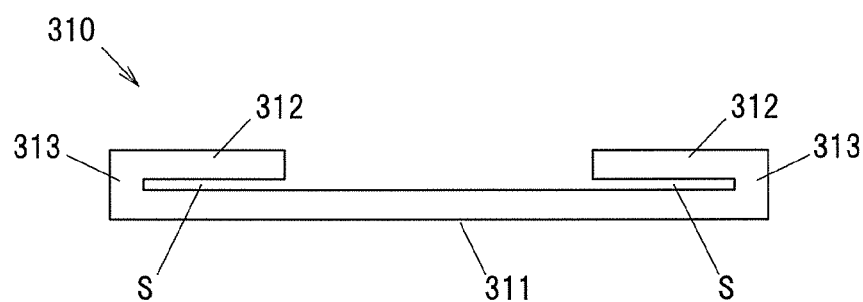

FIG. 5C is a plan view showing a metal plate 310 before being shaped into the conductive member 210.

A plate-shaped metal material having conductivity is stamped out into a shape shown in FIG. 5C and the metal plate 310 obtained by the stamping is bent by, e.g., press working, thereby forming the conductive member 210.

The metal plate 310 integrally has a first plate portion 311 to be the arc portion 211, second plate portions 312 to be the terminal portions 212 and coupling members 313 formed between the first plate portion 311 and the second plate portions 312. The coupling member 313 is to be a part of the curved portion 213 and couples the first plate portion 311 to the second plate portion 312. The first plate portion 311 and the second plate portion 312 are parallel to each other and a clearance gap S is formed therebetween.

Plural metal plates 310 are stamped from a single metal material and are each bent and formed into the conductive member 210.

Method of Manufacturing Electric Motor 1

FIGS. 6A to 6D are explanatory diagrams illustrating a procedure for welding and joining two conductive members 210 together with the end portion 111a of the winding 111 in a method of manufacturing the electric motor 1.

The welding includes an arrangement step of annularly arranging plural conductive members 210 so that the respective terminal portions 212 face each other, an insertion step of inserting the end portion 111a of the winding 111 between the terminal portions 212 without removing the insulation cover, a pressing step of pressing the terminal portions 212 in a direction of approaching each other to bring the terminal portions 212 into contact with each other and also to sandwich the end portion 111a of the winding 111 between the terminal portions 212, and a welding step of welding the terminal portions 212 to each other together with the end portion 111a of the winding 111 by supplying electricity to the conductive members 210.

Each step will be described in detail below. In the following description, one of two coupled conductive members 210 is defined as "a conductive member 210'" and "apostrophe (')" is each added to a reference numeral of each constituent element of the conductive member 210' for convenience of explanation.

Arrangement Step

Figure 6A:
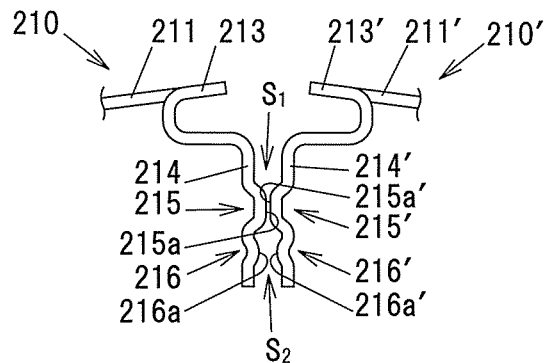
FIGS. 6A to 6D are explanatory diagrams illustrating a procedure for welding and joining two conductive members together with an end portion of a winding.

FIG. 6A shows a state in which the conductive member 210 and the conductive member 210' are arranged along a circumferential direction of the first bus ring 21. In the arrangement step, the terminal portion 212 of the conductive member 210 and a terminal portion 212' of the conductive member 210' face each other in the circumferential direction of the first bus ring 21. Accordingly, the contact surface 215a of the contact portion 215 of the terminal portion 212 and a contact surface 215a' of a contact portion 215' of the terminal portion 212' face each other via a slit-like space $S_1$. In addition, a space $S_2$ having a wider circumferential width than the space $S_1$ is formed between the contact surface 216a of the welding portion 216 and a contact surface 216a' of a welding portion 216'.

Insertion Step

Figure 6B:
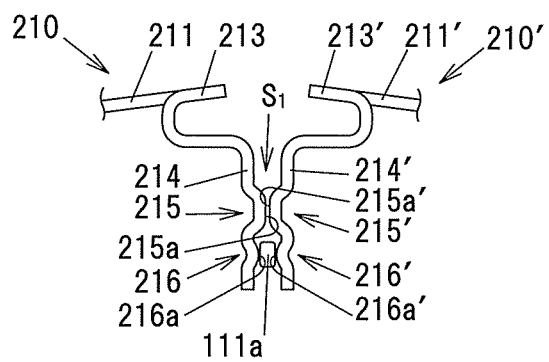

FIG. 6B shows a state in which the end portion 111a of the winding 111 is inserted in the space $S_2$ located between the contact surface 216a and the contact surface 216a'. The end portion 111a of the winding 111 inserted into the space $S_2$ is parallel to an axial direction of the first bus ring 21, as shown in FIG. 4B. Note that, in this state, the contact surfaces 216a and 216a' may be either in contact with or not in contact with the end portion 111a of the winding 111.

Pressing Step

Figure 6C:
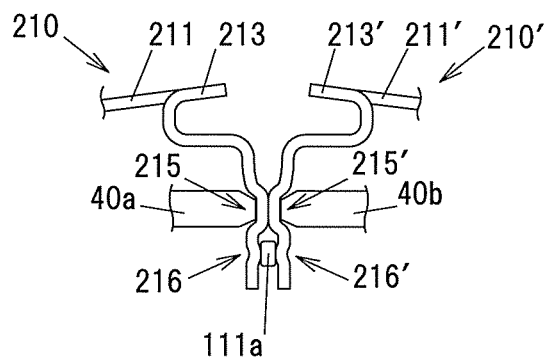

FIG. 6C shows a state in which the contact portion 215 of the terminal portion 212 and the contact portion 215' of the terminal portion 212' are pressed by tip end portions 40a and 40b of a jig to bring the contact surface 215a of the contact portion 215 into contact with the contact surface 215a' of the contact portion 215'. The tip end portion 40a of the jig is in contact with a surface of the contact portion 215 opposite to the contact surface 215a and the tip end portion 40b of the jig is in contact with a surface of the contact portion 215' opposite to the contact surface 215a'.

As a result, the terminal portion 212 is electrically contact to the terminal portion 212'. In addition, the contact surface 216a of the welding portion 216 and the contact surface 216a' of the welding portion 216' elastically come into contact with the end portion 111a of the winding 111 due to elasticity of the terminal portion 212. In this regard, however, electrical continuity is not obtained at contact points between the contact surfaces 216a, 216a' and the end portion 111a since an insulation cover of the winding 111 is not removed.

Welding Step

Figure 6D:
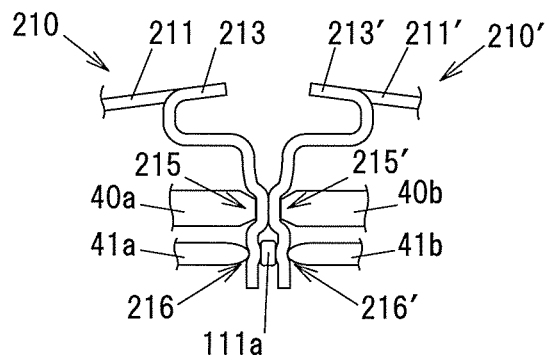

FIG. 6D shows a state of performing welding by supplying electricity to a pair of electrodes 41a, 41b which are brought into contact with the welding portion 216 and 216'. The electrode 41a is in contact with a surface of the welding portion 216 opposite to the contact surface 216a and the electrode 41b is in contact with a surface of the welding portion 216' opposite to the contact surface 216a'.

When electricity is supplied to the electrodes 41a and 41b, a current flows via the contact surface 215a of the contact portion 215 and the contact surface 215a' of the contact portion 215' since the end portion 111a of the winding 111 is not electrically continuous to the contact surfaces 216a and 216a' in the initial stage of the welding step. When the contact portions 215, 215' and the welding portions 216, 216' are heated by Joule heat generated by this current, the insulation cover of the end portion 111a of the winding 111 is melted and the welding portions 216 and 216' are electrically conducted to the end portion 111a of the winding 111 at the contact surfaces 216a and 216a'.

When the welding portions 216 and 216' are electrically conducted to the end portion 111a of the winding 111, a portion of the current supplied from the electrodes 41a and 41b flows through the end portion 111a of the winding 111 via the contact surfaces 216a and 216a'. Then, the welding portions 216 and 216' are melted and adhered to the end portion 111a of the winding 111 by Joule heat generated by the current flowing through this path. As a result, the conductive member 210 is coupled to the conductive member 210' and also the conductive member 210 and 210' are electrically conducted to the winding 111. Note that, the second bus ring 22 and the third bus ring 23 are formed in the same manner as the first bus ring 21.

Structure of Neutral Conductor 24

Figure 7A:
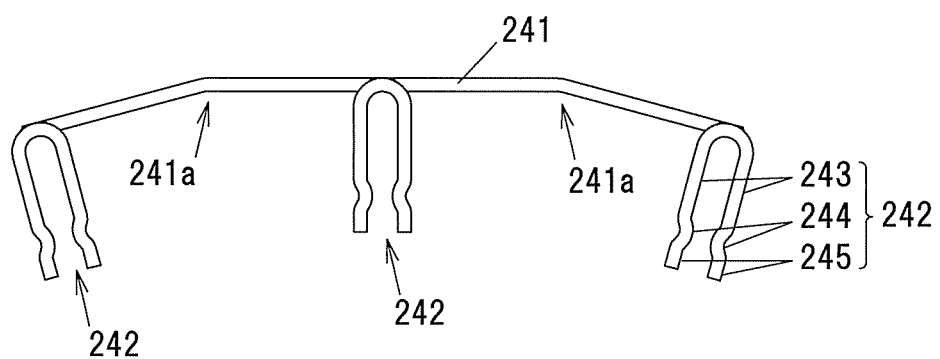
Figure 7B:
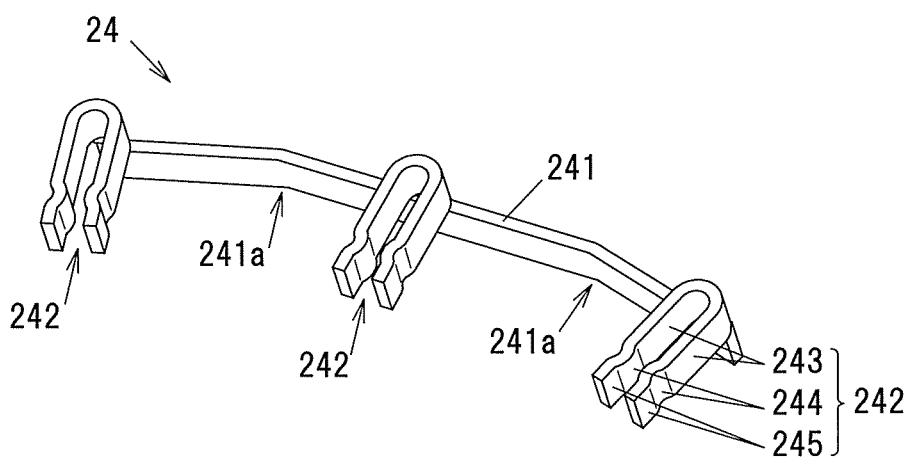

FIGS. 7A and 7B show the neutral conductor 24, wherein FIG. 7A is a plan view and FIG. 7B is a perspective view The neutral conductor 24 is formed by bending a plate-like conductive body and integrally has the arc portion 241 and the three terminal portions 242. The arc portion 241 is bent at two bent portions 241a located at positions in a circumferential direction and has an arcuate shape extending along a circumferential direction of the holding member 20. The terminal portions 242 are provided on the both end portions and middle portion of the arc portion 241.

The terminal portion 242 has a pair of extension portions 243 forming a U-shape and extending in a direction orthogonal to the arc portion 241, a pair of contact portions 244 and a pair of welding portions 245. The pair of extension portions 243 are formed contiguous to the arc portion 241, and the contact portion 244 is formed between the extension portion 243 and the welding portion 245.

The U-phase winding 111, the V-phase winding 112 and the W-phase winding 113 are respectively connected to the three terminal portions 242 of the neutral conductor 24 between each pair of welding portions 245 by welding. When an electric current is supplied from, e.g., electrodes which are in contact with the contact portions 244, the insulation covers of the windings 111, 112 and 113 are melted by Joule heat generated by the electric current and the pair of welding portions 245 are welded to the windings 111, 112 and 113. Note that, the contact portions 244 do not need to be in contact with each other for welding the neutral conductor 24 to the winding 111, 112 or 113 since the current flows via the pair of U-shaped extension portions 243 in a U-shape. In addition, in the electric power collection and distribution ring 10, the plural neutral conductors 24 are not coupled to each other and each neutral conductor 24 is separately held in the holding groove 204 of the holding member 20.

Functions and Effects of the First Embodiment

The following functions and effects are obtained in the first embodiment.

(1) Since it is possible to weld the end portions 111a, 112a and 113a of the windings 111, 112 and 113 to the first to third bus rings 21 to 23 without removing the insulation covers, a step of removing the insulation cover is no longer needed. This allows production time of the electric power collection and distribution ring 10 and the electric motor 1 to be shortened and the cost to be reduced.

(2) Since the first bus ring 21 is formed by annularly coupling the plural conductive members 210 by welding, it is possible to significantly improve efficiency in the use of the metal material as compared to the case where, e.g., an annular single-piece bus ring is stamped out of a plate-like metal material. That is, when the annular single-piece bus ring is stamped out, a circular disc-shaped metal plate on the inner side is not used. However, in the first embodiment, it is possible to form the conductive member 210 from the rectangular metal plate 310 shown in FIG. 5C and multiple metal plates 310 can be stamped out of a metal material with a small gap, which allows efficiency in the use of the metal material to be improved. In this regard, the same applies to the second and third bus rings 22 and 23.

(3) Two conductive members 210 adjacent in a circumferential direction of the first bus ring 21 are coupled at the same time as welding to the end portion 111a of the winding 111. In other words, since coupling of the conductive members 210 and electrical connection to the winding 111 can be carried out in a single step, it is possible to further shorten the production time of the electric power collection and distribution ring 10 and the electric motor 1 and to further reduce the cost.

(4) Since the terminal portions 212, 222 and 223 of the first to third bus rings 21 to 23 protrude inward beyond the inner peripheral surface 20b of the holding member 20, the end portions 111a, 112a and 113a of the windings 111, 112 and 113 drawn out parallel to an axial direction of the stator 11 can be welded to the terminal portions 212, 222 and 223 without bending, for example as shown in FIG. 4B. This allows man-hours to be reduced.

(5) The welding portion 216 is provided on a side of the contact portion 215 closer to the tip end of the terminal portion 212 (on the opposite side to the arc portion 211). In other words, the contact surface 216a is provided on a side of the contact surface 215a closer to the tip end of the terminal portion 212. Therefore, it is possible to appropriately sandwich and hold the end portion 111a of the winding 111 by the contact surfaces 216a of the welding portions 216 when the contact surfaces 215a are brought into contact with each other in the pressing step. That is, in order to securely weld the welding portions 216 to the winding 111, it is desirable that the welding portions 216 be elastically pressed against the end portion 111a so that the welding portions 216 are displaced toward the end portion 111a of the winding 111 in accordance with melting thereof at contact portions. If the welding portion 216 is provided on a side of the contact portion 215 closer to the base of the terminal portion 212 (on the extension portion 214 side), displacement of the welding portions 216 is restricted by the extension portions 214 and an effect to displace the welding portions 216 toward the end portion 111a of the winding 111 in accordance with the melting is not obtained. As described above, in the first embodiment, it is possible to weld the welding portions 216 to the winding 111 more securely by providing the contact surface 216a on a side of the contact surface 215a closer to the tip end of the terminal portion 212.

(6) Since the winding 111 is a rectangular wire and the contact surface 216a has a convex arc shape, a contact area between the welding portion 216 and the end portion 111a of the winding 111 is smaller than the case where the contact surface 216a is, e.g., a flat surface. As a result, a current flowing between the welding portions 216 and the winding 111 is concentrated in a narrow area, and accordingly, temperature locally rises at the contact portion therebetween and it is thereby possible to weld the welding portions 216 to the winding 111 more securely.

(7) Since the terminal portion 212 has the curved portion 213 on the arc portion 211 side of the extension portion 214, the terminal portion 212 is easily bent in the pressing step, the contact surfaces 215a of the contact portions 215 are in surface-contact with each other more certainly and it is possible to suppress an increase in a resistance value of a current used for welding which is caused by, e.g., insufficient contact between the contact surfaces 215a. As a result, it is possible to weld the terminal portions 212 to the winding 111 more securely.

(8) In the metal plate 310 shown in FIG. 5C, the first plate portion 311 and the second plate portion 312 face to each other via the clearance gap S to allow the curved portion 213 to be provided on the terminal portion 212. In other words, due to the shape which is folded back at the coupling member 313 and extending as the second plate portion 312 toward the longitudinal middle portion of the first plate portion 311, a longitudinal size of the metal plate 310 is reduced and it is thus possible to further improve efficiency in the use of the metal material.

(9) It is also possible to connect the end portions 111$b$, 112$b$ and 113$b$ of the windings 111, 112 and 113 to the terminal portions 242 of the neutral conductors 24 by welding without removing the insulation covers in the same manner as the connection of the first bus ring 21 to the end portion 111$a$ of the winding 111 and it is possible to further shorten the production time of the electric power collection and distribution ring 10 and the electric motor 1 and to further reduce the cost.

Second Embodiment

Next, the second embodiment of the invention will be described in reference to FIGS. 8A to 9D.

Figure 8A:
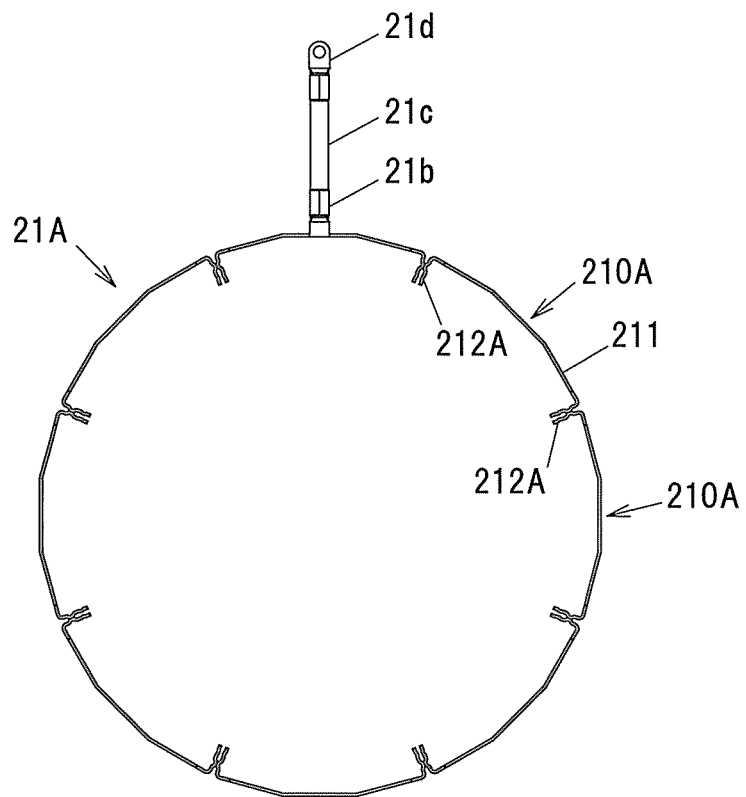
Figure 8B:
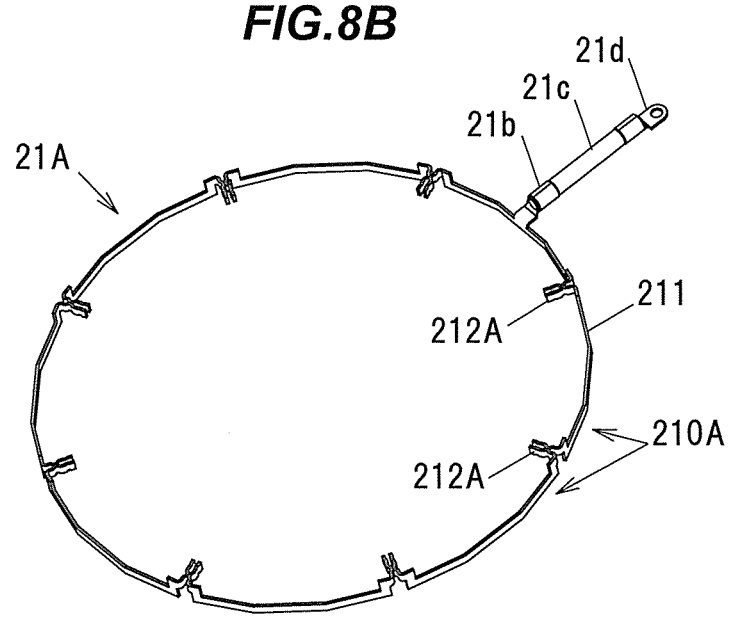
Figure 9A:
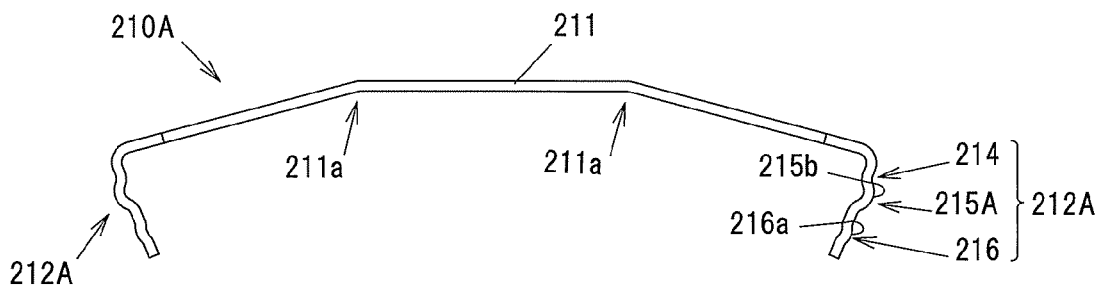
Figure 9B:
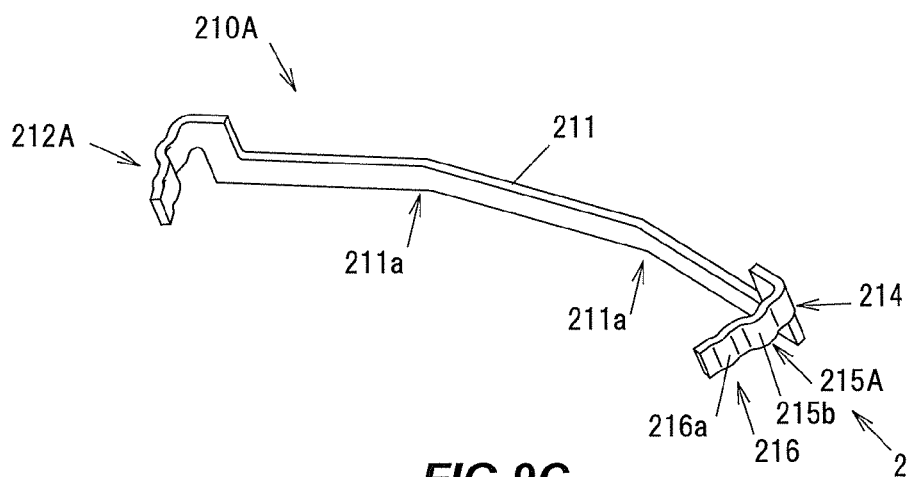
Figure 9C:
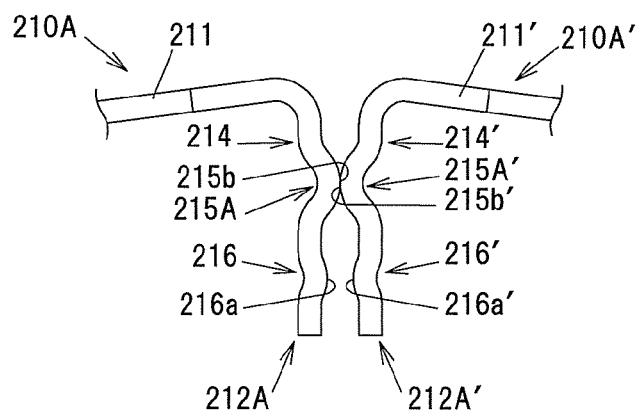
Figure 9D:
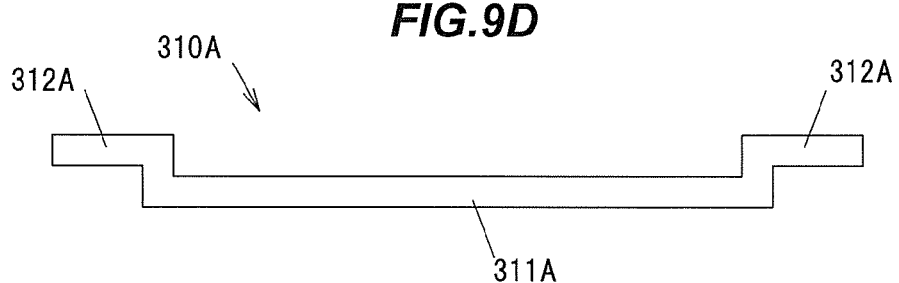

FIGS. 8A and 8B show a first bus ring 21A of the second embodiment, wherein FIG. 8A is a front view and FIG. 8B is a perspective view. FIGS. 9A to 9D show a conductive member 210A in the second embodiment, wherein FIG. 9A is a front view, FIG. 9B is a perspective view, FIG. 9C is a partial enlarged view and FIG. 9D is a plan view showing a metal plate 310A before being shaped into the conductive member 210A.

It should be noted that constituent elements having the same functions as those described in the first embodiment are denoted by the same or corresponding reference numerals and names in the second embodiment and the below-described third to ninth embodiments and an overlapped explanation thereof will be omitted.

As shown in FIGS. 8A and 8B, the first bus ring 21A is formed by annularly coupling plural conductive members 210A and a terminal 21$b$ is provided on one of the conductive members 210A. The terminal 21$b$ is connected via a conductive wire 21$c$ to a connecting terminal 21$d$ for connecting to an inverter.

As shown in FIGS. 9A and 9B, the conductive member 210A integrally has the arc portion 211 and two terminal portions 212A. The terminal portions 212A are provided at both end portions of the arc portion 211.

The terminal portion 212A has the extension portion 214, a contact portion 215A and the welding portion 216. A contact surface 215$b$ having a convex arc shape is formed on the contact portion 215A of the terminal portion 212A. The terminal portion 212A is configured in the same manner as the terminal portion 212 in the first embodiment except that the terminal portion 212A does not have the curved portion 213 and the contact surface 215$b$ is formed in a convex arc shape.

For coupling the conductive members 210A (the conductive member 210A and a conductive member 210A') to each other, the contact surface 215$b$ is brought into contact with a contact surface 215$b$' and an electric current for welding is conducted via the contact surfaces 215$b$ and 215$b$', as shown in FIG. 9C. Other than this, the conductive members 210A are coupled to each other in the same manner as described in the first embodiment.

The conductive member 210A is formed by bending the metal plate 310A shown in FIG. 9D. The metal plate 310A integrally has a first plate portion 311A to be the arc portion 211 and second plate portions 312A to be the terminal portions 212A such that the second plate portions 312A further protrude from both longitudinal end portions of the first plate portion 311A along a longitudinal direction.

The same functions and effects as (1) to (6) described in the first embodiment are obtained also in the second embodiment. In addition, since the contact surface 215$b$ has a convex arc shape, a contact area between the contact portions 215A at the time of the welding step is smaller than that in the first embodiment. This increases temperature of the contact surface 215$b$ during the welding step and facilitates adhesion between the contact portions 215A in addition to the adhesion between the welding portions 216. As a result, it is possible to increase bond strength between the conductive members 210A.

Third Embodiment

Figure 10A:
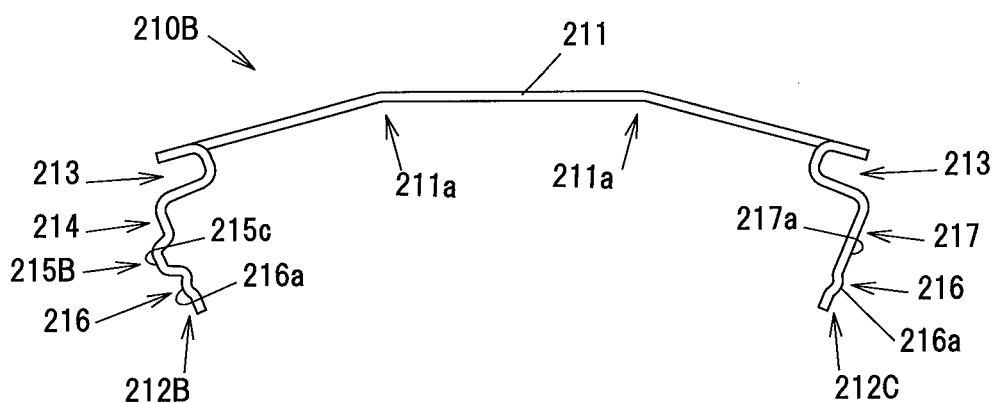
Figure 10B:
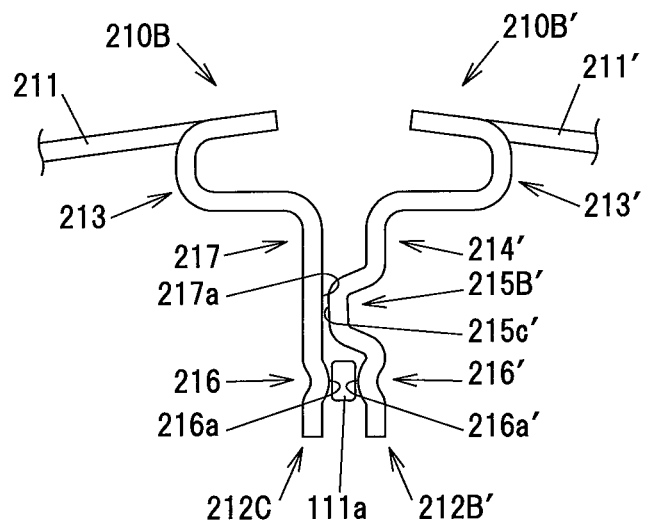

Next, the third embodiment of the invention will be described in reference to FIGS. 10A and 10B. FIGS. 10A and 10B show a conductive member 210B in the third embodiment, wherein FIG. 10A is a front view and FIG. 10B is a partial enlarged view.

The conductive member 210B integrally has the arc portion 211, a first terminal portion 212B and a second terminal portion 212C. The first terminal portion 212B is provided on an end portion of the arc portion 211 and the second terminal portion 212C is provided on another end portion of the arc portion 211.

The first terminal portion 212B has the curved portion 213, the extension portion 214, a contact portion 215B and the welding portion 216. A contact surface 215$c$ of the contact portion 215B is formed as a flat surface. A protruding amount of the contact portion 215B with respect to the welding portion 216 is larger than a protruding amount of the contact portion 215 with respect to the welding portion 216 in the terminal portions 212 of the first embodiment.

The second terminal portion 212C has the curved portion 213, a contact portion 217 and the welding portion 216. The contact portion 217 is linearly formed and also has the functions served by the extension portion 214 and the contact portion 215 of the terminal portions 212 in the first embodiment. A surface of the contact portion 217 on one side is formed as a flat contact surface 217$a$ to be in contact with the contact surface 215$c$ of another adjacent conductive member 210B.

For coupling the conductive members 210B (the conductive member 210B and a conductive member 210B') to each other, the contact surface 217$a$ is brought into contact with a contact surface 215$c$' and an electric current for welding is conducted via the contact surfaces 217$a$ and 215$c$', as shown in FIG. 10B. Other than this, the conductive members 210B are coupled to each other in the same manner as described in the first embodiment.

The same functions and effects as (1) to (7) described in the first embodiment are obtained also in the third embodiment.

Fourth Embodiment

Figure 11:
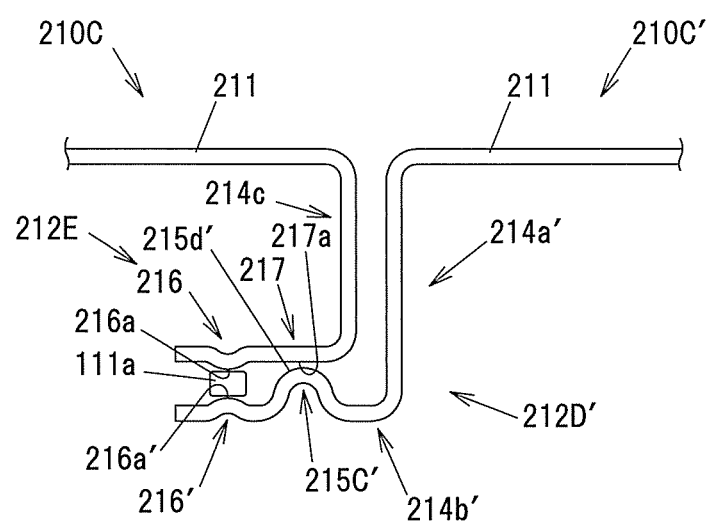
FIG. 11 is an enlarged view showing first and second terminal portions of a conductive member in a fourth embodiment.

Next, the fourth embodiment of the invention will be described in reference to FIG. 11. FIG. 11 is an enlarged view showing first and second terminal portions 212D and 212E of a conductive member 210C in the fourth embodiment. The first terminal portion 212D is provided an end portion of the arc portion 211 and the second terminal portion 212E is provided on another end portion of the arc portion 211.

The first terminal portion 212D has a first extension portion 214$a$ extending in a direction orthogonal to the arc portion 211, a second extension portion 214$b$ extending from a tip end portion of the first extension portion 214$a$ toward the opposite side to the arc portion 211, a contact portion 215C and the welding portion 216. A contact surface 215*d* of the contact portion 215C is formed in a convex arc shape.

The second terminal portion 212E has a third extension portion 214*c* extending in parallel to the first extension portion 214*a*, the contact portion 217 and the welding portion 216. The contact portion 217 is configured in the same manner as the contact portion 217 in the third embodiment. The contact portion 217 is formed to be orthogonal to the third extension portion 214*c* and to face to the arc portion 211 in a parallel manner.

For coupling the conductive members 210C (the conductive member 210C and a conductive member 210C') to each other, the contact surface 217*a* is brought into contact with a contact surface 215*d'* and an electric current for welding is conducted via the contact surfaces 217*a* and 215*d'*. The contact portions 217 and 215C are pressed in a radial direction of a bus ring which is formed by annularly coupling the plural conductive members 210C. Other than this, the conductive members 210C are coupled to each other in the same manner as described in the first embodiment.

The same functions and effects as (1) to (6) described in the first embodiment are obtained also in the fourth embodiment.

Fifth Embodiment

Figure 12A:
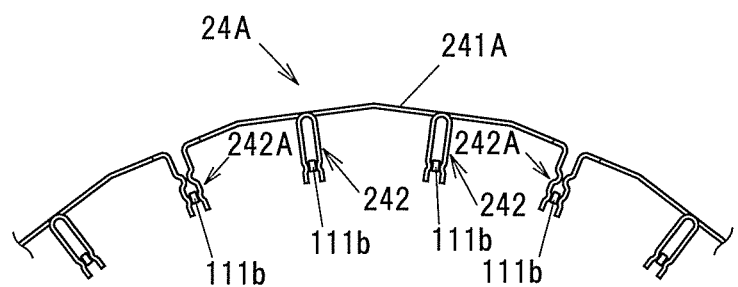
FIG. 12A is a front view showing annular-coupled neutral conductors in a fifth embodiment and FIG. 12B is a front view showing the neutral conductor.
Figure 12B:
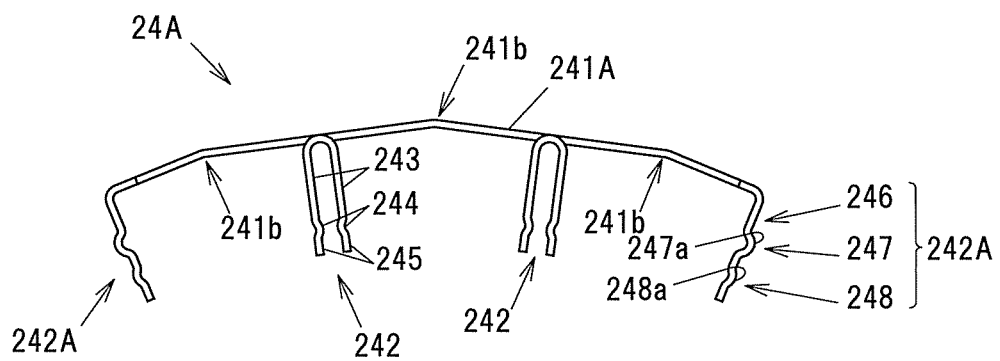

Next, the fifth embodiment of the invention will be described in reference to FIGS. 12A and 12B. FIG. 12A is a front view showing annular-coupled neutral conductors 24A in the fifth embodiment. FIG. 12B is a front view showing the neutral conductor 24A.

The neutral conductor 24A integrally has an arc portion 241A, two terminal portions 242A provided at both end portions of the arc portion 241A and two terminal portions 242 provided between the two terminal portions 242A.

The neutral conductors 24A is bent at three bent portions 241*b* located at positions in a circumferential direction and has an arcuate shape. The two terminal portions 242 are each provided between two adjacent bent portions 241*b*. The terminal portion 242A is configured in the same manner as the terminal portion 242 of the neutral conductors 24 in the first embodiment.

The terminal portion 242A has an extension portion 246, a contact portion 247 provided on the tip end side of the extension portion 246 and a welding portion 248 provided on the tip end side of the contact portion 247. A convex arc-shaped contact surface 247*a* is formed on the contact portion 247. A contact surface 248*a* to be in contact with the end portion 111*b* of the winding 111 is formed on the welding portion 248.

Two circumferentially adjacent neutral conductors 24A are coupled by welding the terminal portions 242A to each other. The end portion 111*b* of the winding 111 is sandwiched and held between the contact surface 248*a* of one of the two neutral conductors 24A and the contact surface 248*a* of another neutral conductor 24A, and the welding portions 248 of the respective neutral conductors 24A are welded to each other together with the end portion 111*b* of the winding 111.

In addition, the end portion 111*b* of the winding 111 is welded between a pair of the welding portions 245 of the terminal portion 242.

The same function and effect as (9) described in the first embodiment are obtained also in the fifth embodiment.

Sixth Embodiment

Figure 13A:
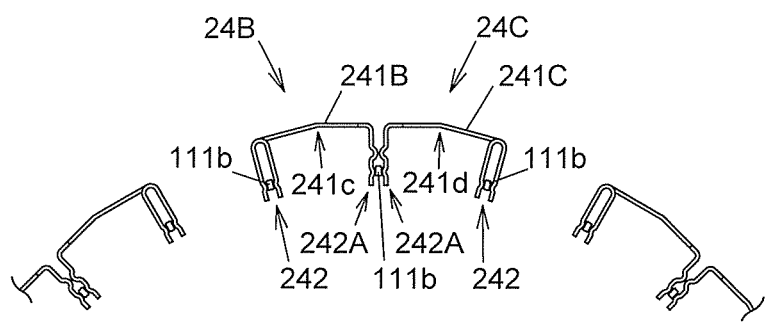
FIG. 13A is a front view showing a neutral conductor annularly coupled to another neutral conductor in a sixth embodiment and FIG. 13B is a front view showing the neutral conductor and the other neutral conductor.
Figure 13B:
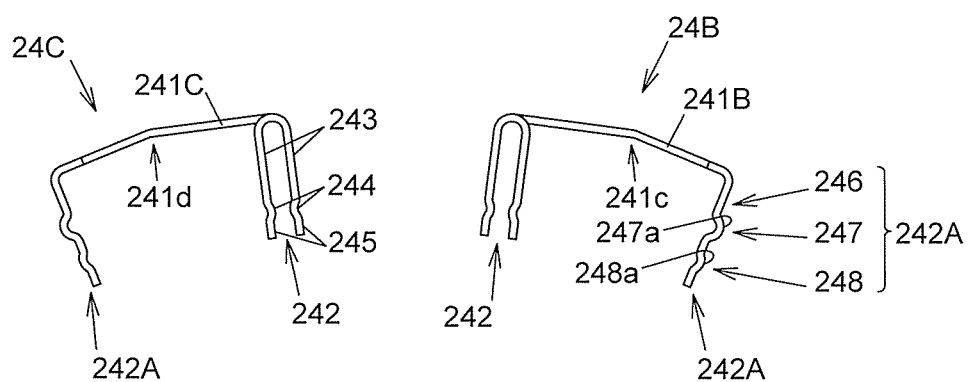

Next, the sixth embodiment of the invention will be described in reference to FIGS. 13A and 13B. FIG. 13A is a front view showing a neutral conductor 24B annularly coupled to another neutral conductor 24C in a sixth embodiment. FIG. 13B is a front view showing the neutral conductors 24B and 24C.

The neutral conductor 24B has an arc portion 241B, the terminal portion 242 and the terminal portion 242A. The arc portion 241B is bent at a bent portion 241*c* located at a position in a circumferential direction and is formed in an arcuate shape. The terminal portion 242 is provided at an end portion of the arc portion 241B and the terminal portion 242A is provided at another end portion of the arc portion 241B.

The neutral conductor 24C has an arc portion 241C, the terminal portion 242 and the terminal portion 242A. The arc portion 241C is bent at a bent portion 241*d* located at a middle portion in a circumferential direction and is formed in an arcuate shape. The arrangement of the terminal portion 242 and the terminal portion 242A in the neutral conductor 24C is inverted with respect to that in the neutral conductor 24B. In other words, the neutral conductors 24C and 24B are formed in a symmetrical shape.

The neutral conductors 24B and 24C are coupled by welding the terminal portions 242A to each other together with the end portion 111*b* of the winding 111. The end portion 111*b* of the winding 111 is sandwiched and held between the welding portion 248 of the terminal portion 242A of the neutral conductor 24B and that of the neutral conductor 24C, and the welding portions 248 of the neutral conductors 24B and 24C are welded to each other together with the end portion 111*b* of the winding 111.

The same function and effect as (9) described in the first embodiment are obtained also in the sixth embodiment.

Seventh Embodiment

Figure 14:
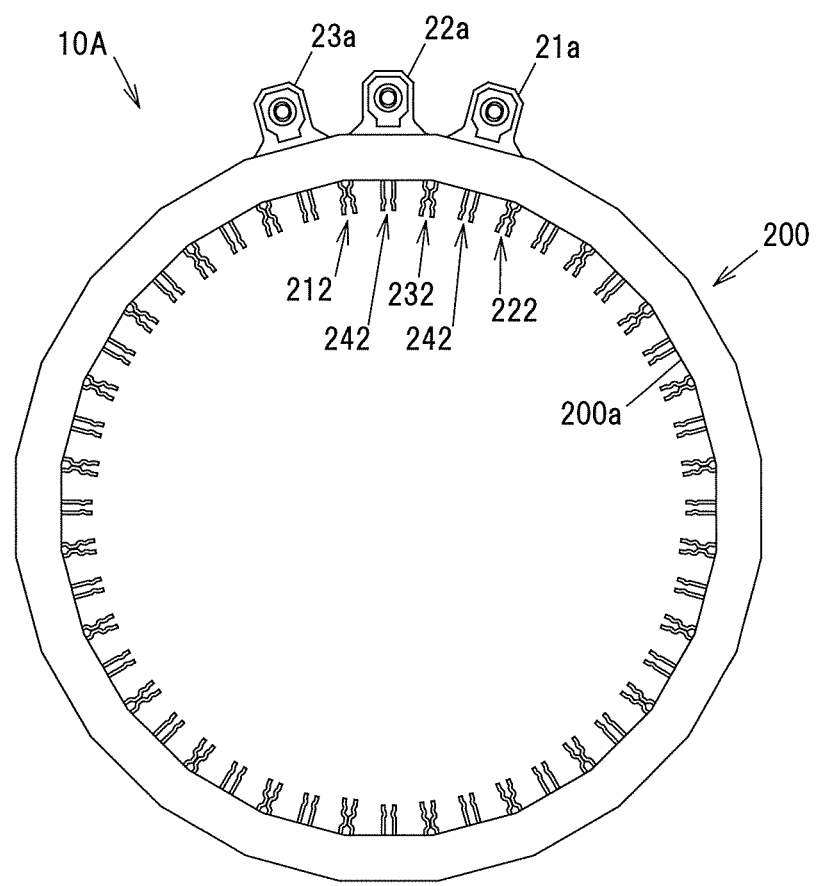
FIG. 14 is a plan view showing an electric power collection and distribution ring in a seventh embodiment.

Next, the seventh embodiment of the invention will be described in reference to FIG. 14. FIG. 14 is a plan view showing an electric power collection and distribution 10A ring in the seventh embodiment.

The electric power collection and distribution ring 10A is different from the electric power collection and distribution ring 10 of the first embodiment in that a holding member 200 including the first to third bus rings 21 to 23 and the plural neutral conductors 24 is entirely resin-molded, and the remaining is configured in the same manner as the first embodiment.

The holding member 200 is formed in an annular shape, and the terminal portions 212, 222, 232 and 242 protrude inward from an inner peripheral surface 200*a* thereof.

The same functions and effects as (1) to (9) described in the first embodiment are obtained also in the seventh embodiment. In addition, since stress in the terminal portion 212 generated at the time of welding the end portion 111*a* of the winding 111 to the welding portions 216 of the terminal portion 212 (see FIG. 6) is relaxed by the contact portion 215, it is possible to suppress occurrence of cracks, etc., on the inner peripheral surface 200*a* of the holding member 200 in the vicinity of a lead-out portion of the terminal portion 212. In this regard, the same applies to the terminal portions 222 and 223 of the second and third bus rings 22 and 23.

Eighth Embodiment

Figure 15:
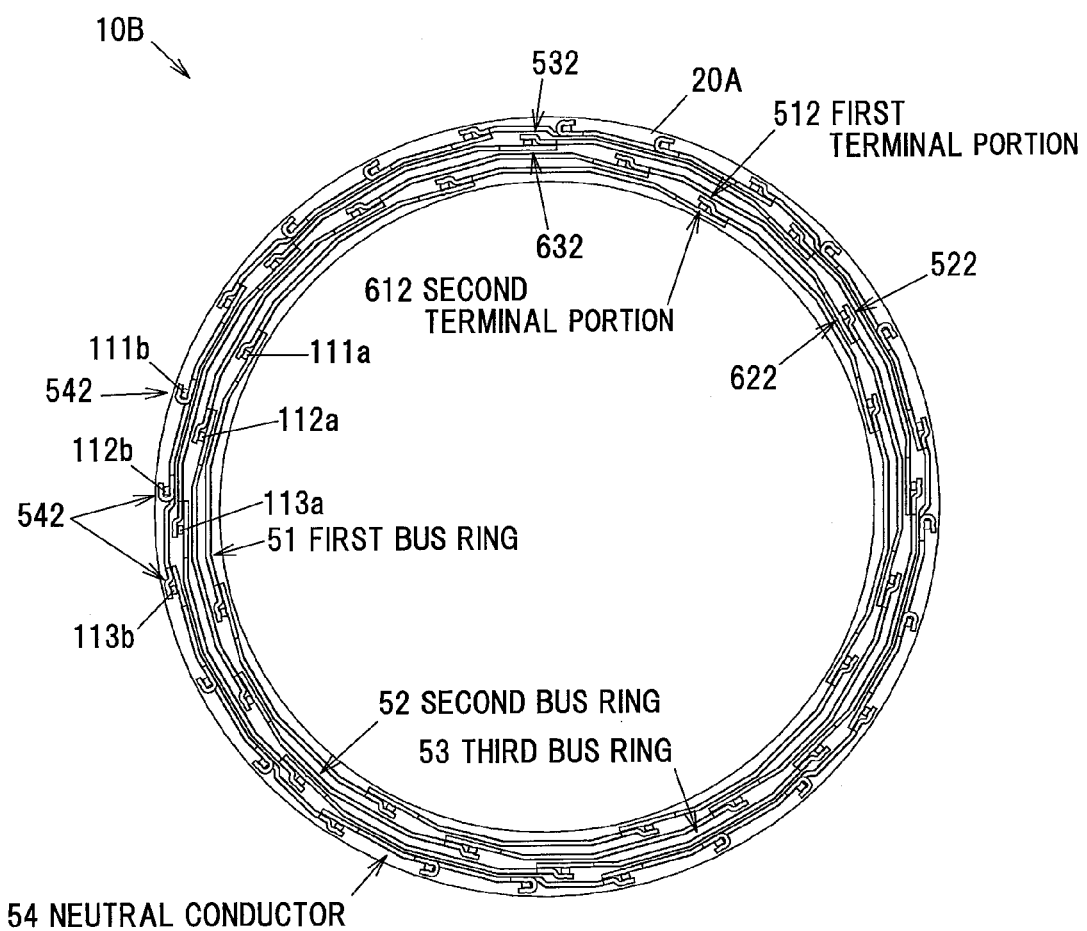
FIG. 15 is a plan view showing an electric power collection and distribution ring in an eighth embodiment.

Next, the eighth embodiment of the invention will be described in reference to FIGS. 15 to 16B. FIG. 15 is a plan view showing an electric power collection and distribution ring 10B in the eighth embodiment. FIGS. 16A and 16B are enlarged views showing a conductive member 510 in the eighth embodiment, wherein FIG. 16A is a perspective view and FIG. 16B is a front view.

The electric power collection and distribution ring 10B in the eighth embodiment is provided with first to third bus rings 51 to 53 and a neutral conductor 54 in place of the first to third bus rings 21 to 23 and the neutral conductors 24 of the electric power collection and distribution ring 10 in the first embodiment. In addition, the first to third bus rings 51 to 53 and the neutral conductor 54 are held by a holding member 20A in place of the holding member 20 in the first embodiment. Plural holding grooves for housing the first to third bus rings 51 to 53 and the neutral conductor 54 are formed on the holding member 20A in the same manner as the holding member 20 in the first embodiment.

In addition, the shapes of a first terminal portion 512 and a second terminal portion 612 of the first bus ring 51, a first terminal portion 522 and a second terminal portion 622 of the second bus ring 52, a first terminal portion 532 and a second terminal portion 632 of the third bus ring 53 and a terminal portion 542 of the neutral conductor 54 in the eighth embodiment are different from the shapes of the terminal portions 212, 222, 232 and 242 of the first to third bus rings 21 to 23 and the neutral conductor 24 in the first embodiment. The first terminal portions 512 and the second terminal portions 612 of the first bus ring 51, the first terminal portions 522 and the second terminal portions 622 of the second bus ring 52, the first terminal portions 532 and the second terminal portions 632 of the third bus ring 53 and the terminal portions 542 of the neutral conductor 54 in the eighth embodiment are provided respectively along circumferential directions of the first to third bus rings 51 to 53 and the neutral conductor 54 while the terminal portions 212, 222, 232 and 242 of the first to third bus rings 21 to 23 and the neutral conductors 24 in the first embodiment protrude inward beyond the inner peripheral surface 20b of the holding member 20.

The conductive member 510 constituting the first bus ring 51 integrally has an arc portion 511, the first terminal portion 512 and the second terminal portion 612. The first terminal portion 512 and the second terminal portion 612 are formed to extend respectively from both end portions of the arc portion 511 along a circumferential direction of the first bus ring 51.

The first terminal portion 512 has a first straight portion 513, a curved portion 514, a welding portion 515 and a second straight portion 516 such that the first straight portion 513, the curved portion 514, the welding portion 515 and the second straight portion 516 are arranged in this order from the arc portion 511 side. In other words, the curved portion 514 and the welding portion 515 are sandwiched between the first straight portion 513 and the second straight portion 516. A contact surface 515a having a convex arc shape is formed on the welding portion 515.

The second terminal portion 612 has a first straight portion 613, a welding portion 615 and a second straight portion 616 such that the first straight portion 613, the welding portion 615 and the second straight portion 616 are arranged in this order from the arc portion 511 side. In other words, the welding portion 615 is sandwiched between the first straight portion 613 and the second straight portion 616. In addition, the second terminal portion 612 does not have a curved portion. Note that, in FIGS. 16A and 16B, the second terminal portion 612 is shown as a second terminal portion 612', the first straight portion 613 is shown as a first straight portion 613', the welding portion 615 is shown as a welding portion 615' and the second straight portion 616 is shown as a second straight portion 616'.

In the eight embodiment, the conductive member 510 is configured to have a width in an axial direction of the first bus ring 51 such that a width $W_2$ at the first terminal portion 512 and the second terminal portion 612 is the same as a width $W_1$ at the arc portion 511.

The first bus ring 51 is formed by coupling the conductive members 510 (the conductive member 510 and a conductive member 510') to each other. As shown in FIG. 16B, a contact surface 513a of the first straight portion 513 of the first terminal portion 512 is arranged to face a contact surface 616a' of the second straight portion 616' of the second terminal portion 612'. As a result, the contact surface 515a of the welding portion 515 of the first terminal portion 512 faces a contact surface 615a' of the welding portion 615' of the second terminal portion 612'.

For coupling the conductive members 510 (the conductive member 510 and the conductive member 510') to each other after inserting the end portion 111a of the winding 111 between the welding portion 515 of the first terminal portion 512 and the welding portion 615' of the second terminal portion 612', an electric current for welding is conducted via the contact surface 513a of the first terminal portion 512 and the contact surface 616a' of the second terminal portion 612'. As a result, the welding portions 515 and 615' are welded to the end portion 111a of the winding 111 and the conductive members 510 and 510' are electrically connected to the winding 111. Also, the second bus ring 52 and the third bus ring 53 are formed in the same manner as the first bus ring 51.

In the eighth embodiment, the contact surface 513a of the first terminal portion 512 and the contact surface 616a' of the second terminal portion 612' remain welded even after the conductive members 510 and 510' are welded to the winding 111.

In the eighth embodiment, the following functions and effects are obtained in addition to those described in the first embodiment.

Since the first terminal portion 512 and the second terminal portion 612 are formed to extend from the arc portion 511 along a circumferential direction of the first bus ring 51, a step of inwardly protruding the terminal portions beyond the inner peripheral surface 20b of the holding member 20 is not required unlike the terminal portions 212, 222 and 223 of the first to third bus rings 21 to 23 in the first embodiment, which leads to improvement in work efficiency. Note that, the same functions and effects are obtained also by the second bus ring 52 and the third bus ring 53. In addition, it is possible to reduce the radial size of the electric power collection and distribution ring 10B.

Ninth Embodiment

Figure 17:
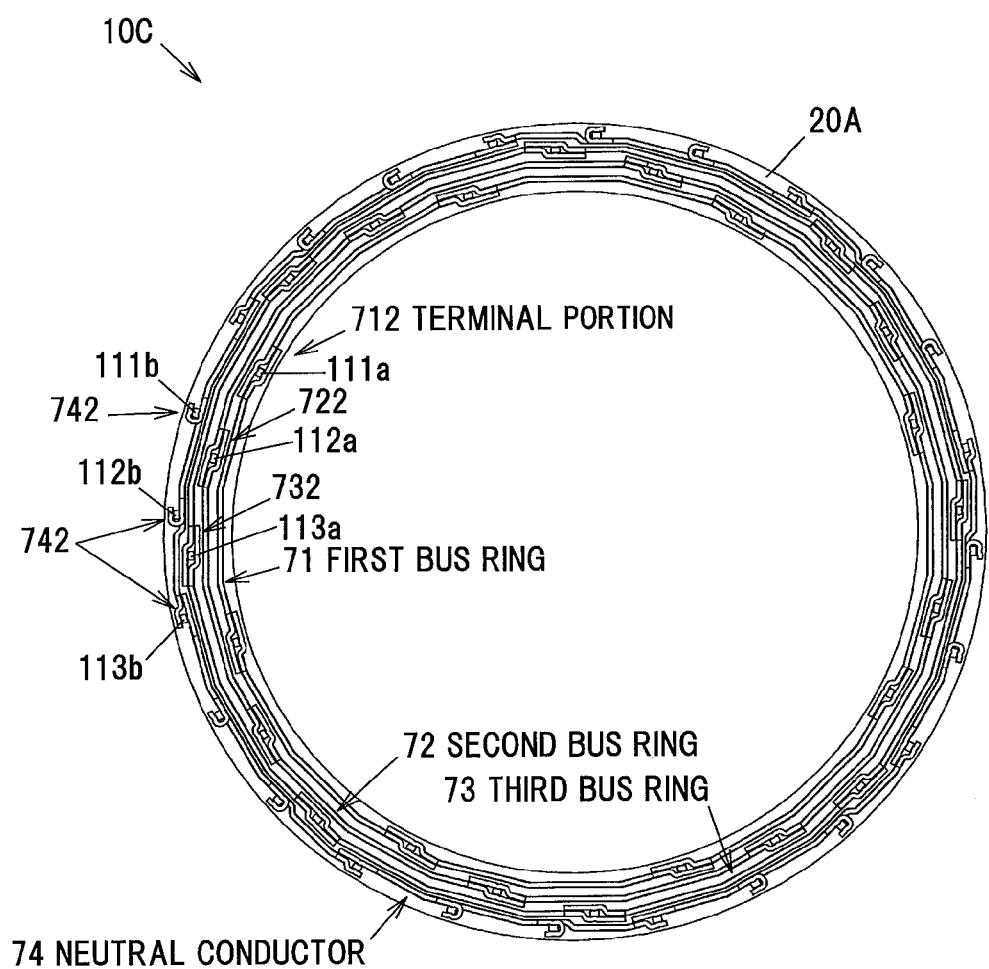
FIG. 17 is a plan view showing an electric power collection and distribution ring in a ninth embodiment.

Next, the ninth embodiment will be described in reference to FIGS. 17 to 19B. FIG. 17 is a plan view showing an electric power collection and distribution ring 10C in the ninth embodiment. FIGS. 18A to 18D show a conductive member 710 in the ninth embodiment, wherein FIG. 18A is a front view, FIG. 18B is a perspective view, FIG. 18C is a partial enlarged view and FIG. 18D is a plan view showing a metal plate 810 before being shaped into the conductive member 710.

The electric power collection and distribution ring 10C in the ninth embodiment is provided with first to third bus rings 71 to 73 and a neutral conductor 74 in place of the first to third bus rings 21 to 23 and the neutral conductors 24 of the electric power collection and distribution ring 10 in the first embodiment.

In addition, the shapes of terminal portions 712, 722, 732 and 742 of the first to third bus rings 71 to 73 and the neutral conductor 74 in the ninth embodiment are different from the shapes of the terminal portions 212, 222, 232 and 242 of the first to third bus rings 21 to 23 and the neutral conductor 24 in the first embodiment. The terminal portions 712, 722, 732 and 742 of the first to third bus rings 71 to 73 and the neutral conductor 74 in the ninth embodiment are provided respectively along circumferential directions of the first to third bus rings 71 to 73 and the neutral conductor 74 in the same manner as the eighth embodiment while the terminal portions 212, 222, 232 and 242 of the first to third bus rings 21 to 23 and the neutral conductors 24 in the first embodiment protrude inward beyond the inner peripheral surface 20b of the holding member 20.

As shown in FIGS. 18A and 18B, the conductive member 710 constituting the first bus ring 71 integrally has an arc portion 711 and two terminal portions 712. The two terminal portions 712 are formed to extend respectively from both end portions of the arc portion 711 along a circumferential direction of the first bus ring 71.

The terminal portion 712 has a first straight portion 713, a curved portion 714, a welding portion 715 and a second straight portion 716 such that the first straight portion 713, the curved portion 714, the welding portion 715 and the second straight portion 716 are arranged in this order from the arc portion 711 side. In other words, the curved portion 714 and the welding portion 715 are sandwiched between the first straight portion 713 and the second straight portion 716. A contact surface 715a having a convex arc shape is formed on the welding portion 715.

The first bus ring 71 is formed by coupling the conductive members 710 (the conductive member 710 and a conductive member 710') to each other. As shown in FIG. 18C, a contact surface 713a of the first straight portion 713 is arranged to face a contact surface 716a' of a second straight portion 716', and also, a contact surface 713a' of a first straight portion 713' is arranged to face a contact surface 716a of the second straight portion 716. As a result, the contact surface 715a of the welding portion 715 faces a contact surface 715a' of a welding portion 715'. In other words, the paired contact surfaces 713a and 716a' and the paired contact surfaces 713a' and 716a as the second contact surfaces are provided at two position sandwiching the contact surfaces 715a and 715a' as the first contact surfaces.

The conductive member 710 is formed by bending the metal plate 810 shown in FIG. 18B. A first plate portion 811 to be the arc portion 711 and second plate portions 812 to be the terminal portions 712 are coupled by coupling portions 813, thereby integrally forming the metal plate 810. The second plate portions 812 are formed on the first plate portion 811 on one side in an axial direction of the first bus ring 71 and further protrudes from both longitudinal end portions of the first plate portion 811 along the longitudinal direction. In addition, a width in the axial direction of the first bus ring 71 is smaller in the second plate portion 812 than in the first plate portion 811. In other words, in the conductive member 710, a width in the axial direction of the first bus ring 71 is smaller in the terminal portion 712 than in the arc portion 711.

Figure 19A:
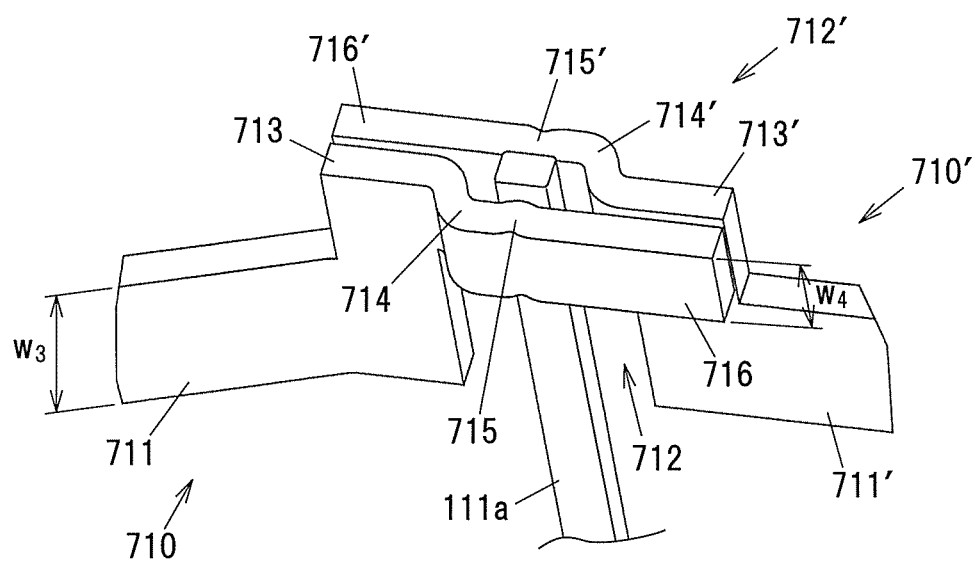
Figure 19B:
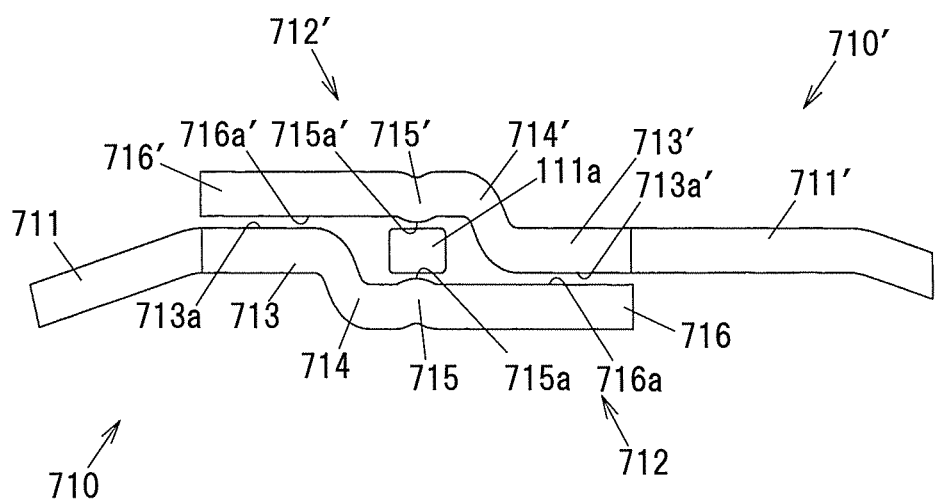

FIGS. 19A and 19B are enlarged views showing the conductive member 710 in the ninth embodiment, wherein FIG. 19A is a perspective view and FIG. 19B is a front view.

As shown in FIGS. 19A and 19B, for coupling the conductive members 710 (the conductive member 710 and the conductive member 710') to each other after inserting the end portion 111a of the winding 111 between the welding portions 715 and 715', an electric current for welding is conducted via the contact surfaces 713a and 716a' and also via the contact surfaces 716a and 713a'. As a result, the welding portions 715 and 715' are welded to the end portion 111a of the winding 111 and the conductive members 710 and 710' are electrically connected to the winding 111. Also, the second bus ring 72 and the third bus ring 73 are formed in the same manner as the first bus ring 71.

In the ninth embodiment, the contact surfaces 713a and 716a' and the contact surfaces 716a and 713a' remain welded even after the conductive members 710 and 710' are welded to the winding 111. When a motor operating current flows through the first bus ring 71, half of the current flows via the contact surfaces 713a and 716a' and another half of the current flows via the contact surfaces 716a and 713a'. In other words, the motor operating current is divided into two flows; one via the contact surfaces 713a and 716a' and another via the surfaces 716a and 713a'. This allows a width $W_4$ of the terminal portion 712 in the axial direction of the first bus ring 71 to be half of a width $W_3$ of the arc portion 711 in the axial direction of the first bus ring 71.

In the ninth embodiment, the following functions and effects are obtained in addition to those described in the first embodiment.

While the current flows through one position between the contact surface 513a of the first terminal portion 512 and the contact surface 616a' of the second terminal portion 612' in the eight embodiment, the current is divided into two which flow via the contact surfaces 713a and 716a' and via the contact surfaces 716a and 713a' in the ninth embodiment when the motor operating current flows through the first bus ring 71. As a result, it is possible to reduce the width $W_4$ of the terminal portions 712 and 712' in the axial direction of the first bus ring 71, leading to reduction in the axial size of the electric power collection and distribution ring 10C.

Summary of the Embodiments

Technical ideas understood from the above described embodiments will be described below citing the reference numerals, etc., used for the embodiments. However, each reference numeral, etc., described below is not intended to limit the constituent elements in the claims to the members specifically described in the embodiments.

[1] An electric power collection and distribution ring (10), provided with plural annular bus rings (the first to third bus rings 21 to 23) for collecting and distributing power to windings (111, 112, 113) of a stator (11), the windings (111, 112, 113) being covered with an insulation cover and the stator (11) being formed by winding the windings (111, 112, 113) around plural teeth (110) arranged in a circular pattern, wherein the bus ring (the first to third bus rings 21 to 23) is formed by annularly coupling plural arc-shaped conductive members (210) each having terminal portions (212, 222, 223) at both circumferential end portions, the terminal portions (212, 222, 223) being welded to each other together with an end portion (111a, 112a, 113a) of the winding (111, 112, 113), and the terminal portion (212, 222, 223) has a first contact surface (216a, 216a') coming into contact with the end portion (111a, 112a, 113a) of the winding (111, 112, 113) at the time of the welding and a second contact surface (215a to 215d) to be a contact point between the terminal portions (212, 222, 223).

[2] The electric power collection and distribution ring (10) described in [1], wherein the conductive member (210) integrally has an arc portion (211) extending along a circumferential direction of the bus ring (21 to 23) and the terminal portions (212), and the terminal portions (212) protrude with respect to the arc portion (211) in a radial direction of the bus ring (the first bus ring 21).

[3] The electric power collection and distribution ring (10B) described in [1], wherein the conductive member (510) integrally has an arc portion (511) extending along a circumferential direction of the bus ring (the first bus ring 51) and the terminal portions (512), and the terminal portions (512) extend from the arc portion (511) along the circumferential direction of the bus ring (the first bus ring 51).

[4] The electric power collection and distribution ring (10B) described in any one of [1] to [3], wherein the second contact surfaces (513a, and 516a) are provided at two positions sandwiching the first contact surface (515a, 515a').

[5] The electric power collection and distribution ring (10B) described in [4], wherein a width of the conductive member (510) in an axial direction of the bus ring (the first bus ring 51) is smaller at the terminal portion (512) than at the arc portion (511).

[6] The electric power collection and distribution ring (10) described in [2], wherein the first contact surface (216a, 216a') is provided on a side of the second contact surface (215a, 215a') closer to a tip end of the terminal portion (212).

[7] The electric power collection and distribution ring (10) described in [2] or [6], wherein the terminal portion (212) has a curved portion (213) on the arc portion (211) side of the first and second contact surfaces (216a, 216a' and 215a, 215a'), the curved portion (213) being curved so as to protrude toward a circumferential middle portion of the arc portion (211).

[8] The electric power collection and distribution ring (10) described in any one of [1] to [7], wherein the wiring (111, 112, 113) is a rectangular wire having a rectangular cross section, and the first contact surface (216a, 216a') is formed in a convex arc shape that protrudes toward the winding (111, 112, 113).

[9] An electric motor (1), provided with the electric power collection and distribution ring (10, 10A, 10B) described in any one of [1] to [8], the stator (11), and a rotor (12) that is rotated with respect to the stator (11) by a magnetic field of the winding (111, 112, 113).

A method of manufacturing an electric motor (1), the electric motor (1) being provide with a stator (11) formed by winding windings (111, 112, 113) covered with an insulation cover around plural teeth (110) arranged in a circular pattern, a rotor (12) that is rotated with respect to the stator (11) by a magnetic field of the windings (111, 112, 113), and plural annular bus rings (the first to third bus rings 21 to 23) for collecting and distributing power to the windings (111, 112, 113), the method including an arrangement step of annularly arranging plural arc-shaped conductive members (210) constituting the bus rings (the first to third bus rings 21 to 23) so that terminal portions (212, 222, 232) formed on respective both end portions face each other, an insertion step of inserting an end portion (111a, 112a, 113a) of the winding (111, 112, 113) between the terminal portions (212, 222, 232) without removing the insulation cover, a pressing step of pressing the terminal portions (212, 222, 232) in a direction of approaching each other to bring the terminal portions (212, 222, 232) into contact with each other and also to sandwich the end portion of the winding between the terminal portions (212, 222, 232), and a welding step of welding the terminal portions (212, 222, 232) to each other together with the end portion (111a, 112a, 113a) of the winding (111, 112, 113) by supplying electricity to the conductive member (210).

Although the embodiments of the invention have been described, the invention according to claims is not to be limited to the above-mentioned embodiments. Further, please note that all combinations of the features described in the embodiments are not necessary to solve the problem of the invention.

In addition, the invention can be appropriately modified and implemented without departing from the gist thereof. For example, although the case where the terminal portions 212, 222 and 232 of the first to third bus rings 21 to 23 protrude inward beyond the inner peripheral surface 20b of the holding member 20 has been described in the first embodiment, the terminal portions 212, 222 and 232 may protrude radially outward from the outer peripheral surface of the holding member 20.

In addition, the order of arrangement of the first to third bus rings 21 to 23 in the electric power collection and distribution ring 10 and the number of the conductive members 210 in the first bus ring 21, etc., are not specifically limited.

In addition, the conductive members 210, 210A, 210B, 210C, 510, 710 and 810 may not be of a bus bar type and may be formed of an insulated wire which has a conductor and an insulation covering the conductor.

What is claimed is:

1. An electric power collection and distribution ring, comprising:
    a plurality of annular bus rings for collecting and distributing power to windings of a stator, the windings being covered with an insulation cover and the stator being formed by winding the windings around a plurality of teeth arranged in a circular pattern,
    wherein the bus ring is formed by annularly coupling a plurality of arc-shaped conductive members each comprising terminal portions at both circumferential end portions, the terminal portions being welded to each other together with an end portion of the winding,
    wherein the terminal portion comprises a first contact surface coming into contact with the end portion of the winding at the time of the welding and a second contact surface to be a contact point between the terminal portions, and
    wherein the second contact surfaces are provided at two positions sandwiching the first contact surface.

2. The electric power collection and distribution ring according to claim 1, wherein the conductive member integrally comprises an arc portion extending along a circumferential direction of the bus ring and the terminal portions, and wherein the terminal portions protrude with respect to the arc portion in a radial direction of the bus ring.

3. The electric power collection and distribution ring according to claim 1, wherein the conductive member integrally comprises an arc portion extending along a circumferential direction of the bus ring and the terminal portions, and wherein the terminal portions extend from the arc portion along the circumferential direction of the bus ring.

4. The electric power collection and distribution ring according to claim 1, wherein a width of the conductive member in an axial direction of the bus ring is smaller at the terminal portion than at the arc portion.

5. The electric power collection and distribution ring according to claim 1, wherein a wiring is a rectangular wire having a rectangular cross section, and wherein the first contact surface is formed in a convex arc shape that protrudes toward the winding.

6. An electric motor, comprising: the electric power collection and distribution ring according to claim 1; the stator; and a rotor that is rotated with respect to the stator by a magnetic field of the winding.

7. An electric power collection and distribution ring, comprising:
- a plurality of annular bus rings for collecting and distributing power to windings of a stator, the windings being covered with an insulation cover and the stator being formed by winding the windings around a plurality of teeth arranged in a circular pattern,
- wherein the bus ring is formed by annularly coupling a plurality of arc-shaped conductive members each comprising terminal portions at both circumferential end portions, adjacent terminal portions being welded to each other together with an end portion of the winding, and
- wherein the terminal portion comprises a first contact surface coming into contact with the end portion of the winding at the time of the welding and a second contact surface to be a contact point between the terminal portions,
- wherein the end portion of the winding is inserted in a space between first contact surfaces of the adjacent terminal portions,
- wherein the first contact surfaces of the adjacent terminal portions are welded to each other together with the end portion of the winding while second contact surfaces of the adjacent terminal portions are in contact with each other.

8. The electric power collection and distribution ring according to claim 7, wherein the conductive member integrally comprises an arc portion extending along a circumferential direction of the bus ring and the terminal portions, and wherein the terminal portions protrude with respect to the arc portion in a radial direction of the bus ring.

9. The electric power collection and distribution ring according to claim 8, wherein the first contact surface is provided closer to a tip end of the terminal portion than the second contact surface.

10. The electric power collection and distribution ring according to claim 8, wherein the terminal portion comprises a curved portion on the arc portion side of the first and second contact surfaces, the curved portion being curved so as to protrude toward a circumferential middle portion of the arc portion.

11. The electric power collection and distribution ring according to claim 7, wherein the conductive member integrally comprises an arc portion extending along a circumferential direction of the bus ring and the terminal portions, and wherein the terminal portions extend from the arc portion along the circumferential direction of the bus ring.

12. The electric power collection and distribution ring according to claim 7, wherein the second contact surfaces are provided at two positions sandwiching the first contact surface.

13. The electric power collection and distribution ring according to claim 12, wherein a width of the conductive member in an axial direction of the bus ring is smaller at the terminal portion than at the arc portion.

14. The electric power collection and distribution ring according to claim 7, wherein the wiring is a rectangular wire having a rectangular cross section, and wherein the first contact surface is formed in a convex arc shape that protrudes toward the winding.

15. An electric motor, comprising: the electric power collection and distribution ring according to claim 7; the stator; and a rotor that is rotated with respect to the stator by a magnetic field of the winding.

* * * * *